(12) United States Patent
Melodia et al.

(10) Patent No.: US 11,374,658 B2
(45) Date of Patent: *Jun. 28, 2022

(54) METHOD AND APPARATUS FOR WIRELESS COMMUNICATIONS

(71) Applicant: Northeastern University, Boston, MA (US)

(72) Inventors: Tommaso Melodia, Newton, MA (US); Emrecan Demirors, Boston, MA (US)

(73) Assignee: NORTHEASTERN UNIVERSITY, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/915,563

(22) Filed: Jun. 29, 2020

(65) Prior Publication Data
US 2020/0396010 A1 Dec. 17, 2020

Related U.S. Application Data

(63) Continuation-in-part of application No. 15/791,181, filed on Oct. 23, 2017, now Pat. No. 10,784,970.
(Continued)

(51) Int. Cl.
| | | |
|---|---|---|
| *H04B 11/00* | (2006.01) | |
| *H04B 13/02* | (2006.01) | |
| *H04B 14/04* | (2006.01) | |

(52) U.S. Cl.
CPC ........... *H04B 11/00* (2013.01); *H04B 13/02* (2013.01); *H04B 14/04* (2013.01)

(58) Field of Classification Search
None
See application file for complete search history.

(56) References Cited

U.S. PATENT DOCUMENTS

| 7,016,649 B1 | 3/2006 | Narasimhan et al. |
| 7,660,338 B2 | 2/2010 | Smith et al. |

(Continued)

FOREIGN PATENT DOCUMENTS

WO WO 2016/112166 A1 7/2016

OTHER PUBLICATIONS

Notification Concerning Transmittal of International Preliminary Report on Patentability for Int'l Application No. PCT/US2017/05772, titled: Method And Apparatus For Wireless Communications, dated May 2, 2019.
(Continued)

*Primary Examiner* — Ajit Patel
(74) *Attorney, Agent, or Firm* — Hamilton, Brook, Smith & Reynolds, P.C.

(57) ABSTRACT

Embodiments disclosed herein may be implemented in the form of a method or corresponding apparatus for receiving or transmitting network communications carried at acoustic wavelengths via an acoustic medium. The corresponding method or apparatus may include a gate-level digital hardware module communicatively coupled to a communications module and define therein logic blocks configured to perform respective primitive processing functions, sequences of the logic blocks being capable of processing data units in accordance with any of the multiple communications protocols on a data unit-by-data unit basis without reconfiguring. According to some embodiments, the gate-level digital hardware module may be configured to process a data unit in accordance with a first communications protocol by directing the data unit through a first sequence of logic blocks, and process a subsequent data unit in accordance with a second communications protocol by directing the subsequent data unit through a second of sequence logic blocks.

21 Claims, 15 Drawing Sheets

Related U.S. Application Data

(60) Provisional application No. 62/411,185, filed on Oct. 21, 2016.

(56) References Cited

U.S. PATENT DOCUMENTS

| | | | |
|---|---|---|---|
| 7,853,206 | B2 | 12/2010 | Rhodes et al. |
| 7,876,786 | B2 | 1/2011 | Bahl et al. |
| 8,340,132 | B2 | 12/2012 | Liva |
| 9,091,790 | B2 | 7/2015 | Caute et al. |
| 9,185,553 | B2 | 11/2015 | Karabinis |
| 9,270,387 | B2 | 2/2016 | Wolfe et al. |
| 9,332,429 | B2 | 5/2016 | Karabinis |
| 9,490,910 | B2 * | 11/2016 | Lacovara ............... H04B 13/02 |
| 9,668,274 | B1 | 5/2017 | Bartlett et al. |
| 9,853,742 | B1 | 12/2017 | Radosevic et al. |
| 9,992,038 | B2 | 6/2018 | Youngbull et al. |
| 2002/0050983 | A1 | 5/2002 | Liu et al. |
| 2007/0209865 | A1 | 9/2007 | Kokosalakis et al. |
| 2014/0108780 | A1 | 4/2014 | Jin et al. |
| 2014/0172141 | A1 | 6/2014 | Mangold |
| 2014/0177514 | A1 * | 6/2014 | Azizi ................. H04B 7/15528 370/315 |
| 2015/0055639 | A1 * | 2/2015 | Park .................... H04B 7/2612 370/338 |
| 2015/0098705 | A1 * | 4/2015 | Motley ................. H04B 10/80 398/104 |
| 2015/0288459 | A1 | 10/2015 | Crowell |
| 2016/0127042 | A1 | 5/2016 | Farr et al. |
| 2016/0235301 | A1 | 8/2016 | Melodia et al. |
| 2016/0352419 | A1 * | 12/2016 | Fonseka ............ H03M 13/2775 |
| 2018/0302172 | A1 | 10/2018 | Petrioli et al. |

OTHER PUBLICATIONS

J. Heidemann, et al., "Underwater sensor networks: applications, advances and challenges," Philosophical Transactions of the Royal Society of London A: Mathematical, Physical and Engineering Sciences, vol. 370, No. 1958, pp. 158-175, 2011.

T. Melodia, et al., "Advances in Underwater Acoustic Networking," in Mobile Ad Hoc Networking: Cutting Edge Directions, second edition ed., S. Basagni, M. Conti, S. Giordano, and I. Stojmenovic, Eds. Inc., Hoboken, NJ: John Wiley and Sons, 2013, pp. 804-852.

I. F. Akyildiz, et al., "A Survey on Wireless Multimedia Sensor Networks," Computer Networks (Elsevier), vol. 51 , No. 4, pp. 921-960, Mar. 2007.

Teledyne Benthos, "SM-975/976 SMART Modem, All in One Modem, Float, and Release," A Teledyne Benthos SMART Products Datasheet, 2 pages (Mar. 2013).

S. Pudlewski, et al., "Video Transmission Over Lossy Wireless Networks: A Cross-Layer Perspective," IEEE Journal of Selected Topics in Signal Processing, vol. 9, No. 1, pp. 6-21, Feb. 2015.

N. Cen, et al., "Multi-view Wireless Video Streaming Based on Compressed Sensing: Architecture and Network Optimization," in Proc. of ACM Intl. Symposium on Mobile Ad Hoc Networking and Computing (MobiHoc), Hangzhou, China, Jun. 2015.

XILINX, "Zynq-7000 All Programmable SoC First Generation Architecture", http://www.xilinx.com/products/silicon-devices/soc/zynq-7000, Jun. 7, 2017.

Y. Sun et al., "The Internet Underwater: An IP-compatible Protocol Stack for Commercial Undersea Modems," in Proc. of ACM Intl. Conf. on Underwater Networks and Systems (WUWNet), Kaohsiung, Taiwan, Nov. 2013.

C. Capus, et al., "Bio-inspired wideband sonar signals based on observations of the bottlenose dolphin (tursiops truncatus)," The Journal of the Acoustical Society of America, vol. 121, No. 1, pp. 594-604, 2007.

D. Houser, et al., "Classification of dolphin echolocation clicks by energy and frequency distributions," The Journal of the Acoustical Society of America, vol. 106, pp. 1579-1585, 1999.

Teledyne Benthos, "SMART Products", http://teledynebenthos.com , 2 pages, (Captured by the Internet Archive on Jan. 19, 2016; available at: https://web.archive.org/web/20160119160248/http://teledynebenthods.com/product_dashboard/smart_products).

AquaSent Acoustic Modem, http://wvvw.aquasent.com , 1page, (Captured by the Internet on Archive Mar. 21, 2016; available at: https://web.archive.org/web/20160321070629/http:/www.aquasent.com/ ).

Evologics, Underwater Acoustic Modems, https://www.evologics.de , 1 page (Captured by the Internet on Archive Feb. 10, 2016; available at: https://web.arcchive.org/web/20160210225906/http://evologics.de/ ).

A. Radosevic, et al., "Adaptive OFDM for Underwater Acoustic Channels with Limited Feedback," in Proc. Of Signals, Systems and Computers (ASILOMAR), 2011.

P. Qarabaqi et al., "Adaptive power control for underwater acoustic communications," in Proc. of IEEE OCEANS, Spain, Jun. 2011.

L. Wan, et al., "Field tests of adaptive modulation and coding for underwater acoustic ofdm," in Proc. of the Eighth ACM Intl. Conf. on Underwater Networks and Systems (WUWNet), Taiwan, 2013.

A. Radosevic, et al., "Adaptive OFDM modulation for underwater acoustic communications: Design considerations and experimental results," IEEE Journal of Oceanic Engineering, vol. 39, No. 2, pp. 357-370, Apr. 2014.

E. Demirors, et al., "RcUBe: Real-time reconfigurable radio framework with self-optimization capabilities," in Proc. of IEEE Intl. Conf. on Sensing, Communication, and Networking (SECON), Seattle, WA, Jun. 2015.

G. E. Santagati, et al., "U-Wear: Software-defined ultrasonic networking for wearable devices," in Proc. of IEEE Conference on Mobile Systems, Services and Applications (MOBISYS), Florence, Italy, May 2015.

E. Jones, "The application of software radio techniques to underwater acoustic communications," in Proc. Of IEEE OCEANS, Aberdeen, Scotland, Jun. 2007.

E. M. Sozer, et al., "Reconfigurable acoustic modem for underwater sensor networks," in Proc. of ACM Intl. Workshop on Underwater Networks (WUWNet), Los Angeles, CA, Sep. 2006.

C. Petrioli, et al., "SUNSET Version 2.0: Enhanced framework for simulation, emulation and real-life testing of underwater wireless sensor networks," in Proc. of A CM Intl. Conf. on UnderWater Networks and Systems (WUWNet), Kaohsiung, Taiwan, 2013.

R. Masiero, et al., "DESERT Underwater: An NS-Miracle-based framework to design, simulate, emulate and realize test-beds for underwater network protocols," in Proc. of MTS/IEEE OCEANS, Yeosu, Republic of Korea, May 2012.

Petrioli, "SUNRISE: Building the internet of underwater things," SUNRISE, [Online], Available: http://fp7-sunrise.eu , 2015.

Z. Peng, et al., "Aqua-Net: An underwater Sensor Network Architecture: Design, Implementation, and Initial Testing," in Proc. Of MTS/IEEE OCEANS, Biloxi, MS, Oct. 2009.

WHOI "Micromodem," [Online]. Available: http://acomms.whoi.edu/micro-modem/, 2015 (Captured by the Internet on Archive Mar. 22, 2015; available at: https://web.archive.org/web/20150322042554/http://acomms.whoi.edu/micro-modem/ ).

M. Chitre, et al., "UnetStack: an Agent-based Software Stack and Simulator for Underwater Networks," in Proc. of MTS/IEEE OCEANS, St. John's, Newfoundland, Sep. 2014.

J. Potter, et al. , "Software Defined Open Architecture Modem Development at CMRE," in Proc. Underwater Communications and Networking Workshop (UComms), Sestri Levante, Italy, Sep. 2014.

Y. Noh, et al., "Software-defined underwater acoustic networking platform and its applications," Ad Hoc Networks (Elsevier), 2015.

"USRP products," [Online]. Available: http://www.ettus.com, 2015, (Captured by the Internet Archive on Mar. 15, 2015; available at: https://web.archive.org/web/20150315001630/http://www.ettus.com ).

N. Nowsheen, et al., "A high data-rate, software-defined underwater acoustic modem," in Proc. of MTS/IEEE OCEANS, Seattle, WA, Sep. 2010.

M. Chitre, et al., "The UNET-2 modem—An extensible tool for underwater networking research," in Proc. of MTS/IEEE OCEANS, Yeosu, Republic of Korea, May 2012.

(56) References Cited

OTHER PUBLICATIONS

E. Demirors, et al., "Design of A Software-defined Underwater Acoustic Modem with Real-time Physical Layer Adaptation Capabilities," in Proc. of ACM Intl. Conf. on Underwater Networks 8 Systems (WUWNet), Rome, Italy, Nov. 2014.
G. Sklivanitis, et al., "Receiver Configuration and Testbed Development for Underwater Cognitive Channelization," in Proc. of IEEE Asilomar Conf. on Signals, Systems, and Computers, Pacific Grove, CA, Nov. 2014.
S. Zhou, et al., OFDM for Underwater Acoustic Communications. John Wiley and Sons, Inc., 2014, pp. 1-95.
L. LeBlanc, et al., "Improved chirp FSK modem for high reliability communications in shallow water," in Proc. of MTS/IEEE OCEANS, Sep. 2000.
L. Kleinrock, et al., "Packet switching in radio channels: Part I-carrier sense multiple-access modes and their throughput-delay characteristics," IEEE Transactions on Communications, vol. 23, No. 12, pp. 1400-1416, Dec. 1975.
N. Abramson, "The ALOHA System: another alternative for computer communications," in Proc. Of the Fall Joint Computer Conference (F JCC), AFIPS, Houston, TX, Nov. 1970.
Teensy USB Development Board, "Teensy USB Development Board," [Online]. Available: https://jwww.pjrc.com/teensy , 2015.
Teledyne Reson Products, http://www.teledyne-reson.com/products , (Captured by the Internet Archive on May 2, 2015; available at: https://web.archive.org/web/20150502121057/http://www.teledyne-reson.com:80/products/ ).
Texas Instruments "TPA3116D2 Evaluation Module," [Online]. Available: http://www.ti.com/tool/tpa32116d2evm , 2015. (Captured by the Internet Archive on Dec. 10, 2015; available at: http://web.archive.org/web/20151210122606/http://www.ti.com:80/tool/tpa3116d2evm ).
Mini-Circuits, "RF /IF & Microwave components DC to 40 GHz." [Online]. Available: http://www.minicircuits.com , 2014, (Captured by the Internet Archive on Dec. 21, 2014; available at: https://web.archive.org/web/20141221135401/htpp://www.minicircuits.com:80/homepage/homepage.html ).
"ICL8038 Datasheet," Apr. 2001.
Analog Devices, "AD633 Datasheet," 2015. [Online]. Available: http://www.analog.com/media/en/technical-documentation/datasheets/AD533.pdf , 2015.
PJRC Electronic Projects, "Teensy Audio Library," [Onlinie]. Available: https://www.pjrc.com/teensy/td_libs_Audio.html, 2016 (Captured by the INternet Archive on Oct. 14, 2016; available at: https://web.archive.org/web/20161014081008/https://www.pjrc.com/teensy/td_libs_Audio.html ).
PJRC Electronic Projects, "Teenstduino," [Online]. Available: https://www.pjrc.com//teensy/teensyduino.html , 2016 (Captured by the Internet Archive on Oct. 19, 2016; available at: https://web.archive.org/web/20161019214758/https://www.pjrc.com/teensy/teensyduino.html ).
G. Sklivanitis,et al., "Addressing next-generation wireless challenges with commercial software-defined redio platforms," IEEE Communications Magazine, vol. 54, No. 1, pp. 59-67, Jan. 2016.
E. Demirors, et al., "SEANet: A Software-Defined Acoustic Networking Framework for Reconfigurable Underwater Networking," in Proc. of ACM Intl. Conf. on Underwater Networks B Systems (WUWNet), Washington, DC, Nov. 2015.
E. Demirors, et al., "Software-defined underwater acoustic networks: Toward a hgih-rate real-time reconfigurable modem," Communications Magazine, IEEE, vol. 53, No. 11, pp. 64-71, Nov. 2015.
M. Molins, et al., "Slotted FAMA: a MAC protocol for underwater acoustic networks," in Proc. Of MTS/IEEE OCEANS, Boston, MA, USA, Sep. 2006.
S. Basagni, et al., "Channel-aware routing for underwater wireless networks," in Proceedings of IEEE OCEANS 2012, Yeosu, South Korea, pp. 1-9, May 21-24, 2012.

L. Kuo and T. Melodia, "Cross-layer Routing on MMIMO-OFDM Underwater Acoustic Links," in Proc. of IEEE Cof. on Sensor, Mesh and Ad Hoc Communications Networks (SECON), Seoul, Korea, Jun. 2012.
D. Pompili, et al, "Distributed Routing Algorithms for Underwater Acoustic Sensor Networks," IEEE Transactions on Wireless Communications, vol. 9, No. 9, pp. 2934-2944, Sep. 2010.
Texas Instrument, DAC7821, http://www.ti.com/product/dac7821 (Captured by the Internet Archive on Aug. 15, 2016; available at: https://web.archive.org/web/20160815124419/http://www.ti.com/product/dac7821).
MAXIM , http.//www.maximintegrated.com, 3 pages (Captured by the Internet Archive on Oct. 15, 2016; available at: https://web.archive.org/web/20161015155632/https://wvwwmaximintegrated.com/en.html).
Mini-Circuits, ZHL-6A+, ZHL-6A, http://194.75.38.69/pdfs/ZHL-6A.pdf, 2 pages (No Date Available).
Analog Devices, AD8338, http://www.analog.com/en/products/amplifiers/variable-gain-amplifiers/voltage-controlled-vgas/ad8338, 6 pages (Captured by the Internet Archive on Aug. 22, 2017; available at: https://web.archive.org/web/20170822223742/http://www.analog.com/en/products/amplifiers/variable-gain-amplifiers/analog-control-vgas/ad8338.html ).
M. G. L. Roes, et al., "Acoustic energy transfer: A review," IEEE Transactions on Industrial Electronics, vol. 60, No. 1, pp. 242-248, Jan. 2013.
T. Zaid, S. Saat, Y. Yusop, and N. Jamal, "Contactless energy transfer using acoustic approach—a review," in Computer, Communications, and Control Technology (I4CT), Intl. Con. on, Sep. 2014, pp. 376-381.
G. D. Szarka, B. H. Stark, and S. G. Burrow, "Review of Power Conditioning for Kinetic Energy Harvesting Systems," IEEE Trans. Power Electron., vol. 27, No. 2, pp. 803-815, Feb. 2012.
M. Stojanovic, "Underwater Acoustic Communications," in Encyclopedia of Telecommunications, J. G. Proakis, Ed. John Wiley and Sons, 2003.
T. Yang, et al., "Low probability of detection underwater acoustic communications for mobile platforms," in OCEANS 2008, pp. 1-6, Sep. 2008.
J. Ling, et al., "Covert underwater acoustic communications: Transceiver structures, waveform designs and associated performances," in OCEANS 2010, pp. 1-10, Sep. 2010.
S. Liu, et al., "Covert underwater acoustic communication using whale noise masking on DSSS signal," in OCEANS—Bergen, 2013 MTS/IEEE, pp. 1-6, Jun. 2013.
P. van Walree, et al., "Multicarrier spread spectrum for covert acoustic communications," in OCEANS 2008, pp. 1-8, Sep. 2008.
G. Leus, et al., "Multiband OFDM for Covert Acoustic Communications," Selected Areas In Communications, IEEE Journal on, vol. 26, pp. 1662-1673, 2008.
Springer et al., "Spread Spectrum Communications Using Chirp Signals," IEEE/AFCEA EUROCOMM 2000, Munich, 2000, pp. 166-170.
J. Pinkney, et al., "A robust high speed indoor wireless communications system using chirp spread spectrum," 1999 IEEE Canadian Conference on Electrical and Computer Engineering, vol. 1, pp. 84-89, May 1999.
M. Khan, et al., "Performance of quadratic and exponential multiuser chirp spread spectrum communication systems," in Performance Evaluation of Computer and Telecommunication Systems (SPECTS), 2013 International Symposium on, pp. 58-63, Jul. 2013.
S. Hengstler, et al., "A novel chirp modulation spread spectrum technique for multiple access," in Spread Spectrum Techniques and Applications, 2002 IEEE Seventh International Symposium on, vol. 1, pp. 73-77, 2002.
W. Gugler, et al., "A chirp-based wideband spread spectrum modulation technique for wlan applications," in Spread Spectrum Techniques and Applications, 2000 IEEE Sixth International Symposium on, vol. 1, pp. 83-87, Sep. 2000.
E. Karapistoli, et al., "An overview of the IEEE 802.15.4a Standard," Communications Magazine, IEEE, vol. 48, No. 1, pp. 47-53, Jan. 2010.

(56) References Cited

OTHER PUBLICATIONS

X. Lurton, An introduction to underwater acoustics : principles and applications, ser. Springer-Praxis books in geophysical sciences. New York: Springer, 96 pages, TOC, Chapter 2 and Chapter 6, 2010.

M. Z. Win, et al., "Ultra-wide bandwidth time-hopping spread-spectrum impulse radio for wireless multiple-access communications," IEEE Transactions on Communications, vol. 48, No. 4, pp. 679-691, Apr. 2000.

N. Yamamoto, et al., "Adaptive internally turbo-coded ultra wideband-impulse radio (AITC-UWB-IR) system," in Proc. of IEEE Intl. Conf. on Communications (ICC), pp. 3535-3539, May 2002.

E. Baccarelli, et al., "A Simple Adaptive Coding Scheme for Multiuser Interference Suppression in Ultra-Wideband Radio Transmissions," IEEE Trans. on Communications, vol. 53, No. 8, pp. 1283-1287, Aug. 2005.

X. Shern, et al., "Medium Access Control in Ultra-Wide band Wireless Networks," IEEE Transactions on Vehicular Technology, vol. 54, No. 5, pp. 1663-1677, Sep. 2005.

D. Pompili, et al., "A CDMA-Based Medium Access Control for Underwater Acoustic Sensor Networks," IEEE Transactions on Wireless Communications, pp. 1899-1909, Apr. 2009.

M. Li, et al., "Cognitive code-division links with blind primary-system identification," IEEE Transactions on Wireless Communications, vol. 10, No. 11, pp. 3743-3753, Nov. 2011.

K. Gao, et al., "Spread-spectrum cognitive networking: Distributed channelization and routing," in Proc. of IEEE Military Communications Conf. (MILCOM), pp. 1250-1255, Nov. 2011.

G. Santagati, et al., "Medium access control and rate adaptation for ultrasonic intrabody sensor networks," Networking, IEEE/ ACM Transactions on, vol. 23, No. 4, pp. 1121-1134, Aug. 2015.

Analog Devices, "Low Power, 18MHz Variable Gain Amplifier, AD8338," Data Sheet, 19 pages, 2013.

Burr-Brown Products, "12-Bit, Parallel Input, Multiplying Digital-to-Analog Converter, DAC7821," 23 pages, Jul. 2007.

Analog Devices, "Evaluating the AD8338 Low Power VGA," Evaluation Board User Guide, UG-559, 8 pages, 2013.

International Search Report and Written Opinion for Infl Application No. PCT/US2017/057752, titled: Method and Apparatus for Wireless Communications, dated Feb. 5, 2018.

Awal, Md Rabiul et al., "State-of-the-Art Developments of Acoustic Energy Transfer," International Journal of Antennas and Propagation, vol. 2016, Article ID 3072528, 1.

Benson, Bridget, "Design of a Low-cost Underwater Acoustic Modem for Short-Range Sensor Networks," Thesis, University of California, San Diego, 176 pages (20.

Benson. Bridget et al., "Energy Benefits of Reconfigurable Hardw re for Use in Underwater Sensor Nets," IEEE International Symposium on Parallel & Distributed Processing, 2009 Proceedings: Rome. Italy, pp. 1-7 (May 23, 2009).

Casari, Paolo and Michele Zorzi, "Protocol design issues in underwater acoustic networks." Computer Communications, 34: 2013-2025 (Jun. 25, 2011).

Chowdhury, Kaushik R. and Tommaso Melodia, "Platforms and Testbeds for Experimental Evaluation of Cognitive Ad Hoc Networks," IEEE Communications Magazine, pp. 96-104 (Sep. 2010).

Demirors, Emrecan et al., "Design of A Software-defined Underwater Acoustic Modem with Real-time Physical Layer Adaptation Capabilities," Proceedings of the International Conference on Underwater Networks & Systems, Article No. 25, Rome, Italy (Nov. 12-14, 2014).

Demirors, Emrecan, "Reconfigurable Architectures for RF and Underwater Acoustic Wireless Networks," Dissertation. The Department of Electrncal and Computer Engineering, Northeastern University, 24 pages (Apr. 2017).

Demirors, Emrecan et al.. "SEANet: A Software-Defined Acoustic Networking Framework for Reconfigurable Underwater Networking," Proceedings of the 10th International Conference on Underwater Networks & Systems, 8 pages (Oct. 2015).

Demirors, Emrecan et al.. "SEANet G2: Toward a High-Data-Rate Software-Defined Underwater Acoustic Networking Platfolm," Proceedings of the 11th ACM International Conference on Underwater Networks & Systems, 8 pages (Oct. 2016).

Demirors, Emrecan et al.. "Software-Defined Underwater Acoustic Networks: Toward a High-Rate Real-Time Reconfigurable Modem," IEEE Communications Magazine, pp. 64-71 (Nov. 2015).

Di Francesco, Paolo et al., "A Split MAC Approach for SDR Platforms," IEEE Transactions on Computers, vol. 64, Issue: 4, 14 pages (Apr. 2015).

Doniec, M. and Daniela Rus, "BiDirectional Optical Communication with AquaOptical II," IEEE International Conference on Communication Systems, 6 pages (Nov. 2010).

He. Ke. et al., "Dynamic Reconfiguration Technologies Based on FPGA in Software Defined Radio System," Proceedings of SDR'11-WinnComm-Europe, 8 pages (Jun. 22-24, 2011).

Kim, Youjin et al., "MAC Implementation for IEEE 802.11 Wireless LAN," Joint 4th IEEE International Conference on ATM (ICATM 2001) and High Speed Intelligent Internet Symposium, 5 pages (2001).

Kulhandjian, Hovannes et al., "Towards Experimental Evaluation of Software-Defined Underwater Networked Systems," Proceedings of IEEE Underwater Communications Conference and Workshop (UComms), Sestri Levante, Italy (Sep. 2012).

Li, Yu and Haining Huang, "The design and experiment of a software-defined acoustic modem for underwater sensor network," OCEANS 2010 IEEE—Sydney, Australia, 4 pages (May 24-27, 2010).

Martins, M. S. et al., "High Data Rate Acoustic Modem for Underwater Applications," Telecommunications Symposium (ITS), 5 pages (2014).

Mcdonald, Eric J., "Runtime FPGA Partial Reconfiguration," IEEE A&E Systems Magazine, pp. 10-15 (Jul. 2008).

Molisch, A. et al., "Time hopping and frequency hopping in ultrawideband systems," IEEE Pacific Rim Conference on Communications, Computers and Signal Processing (PACRM), vol. 2, pp. 541-544 (Jul. 2003).

Noh, Youngtae et al., "Software-defined underwater acoustic networking platform and its applications," Ad Hoc Networks,34: 12 pages (Jan. 2015).

Nvchis, George et al., "Enabling MAC Protocol Implementations on Software-defined Radios." NSDI '09: 6th USENIX Symposium on Networked Systems Design and Implementation, 92-105 and attached PowerPoint (2009).

Olama, Mohammed M. et al., "Design, Implementation, and Evaluation of a Hybrid DS/FFH Spread-Spectrum Radio Transceiver," Military Communications Conference (MILCOM), (Oct. 6-8, 2014).

Partial Reconfiguration User Guide, XILINX, UG702 (v 12.1) 126 pages (May 3, 2010).

Peng, Zheng et al., "Nams: A Networked Acoustic Modem System for Underwater Applications," In Proceedings of IEEE OCEANS'11, Kona, Hawaii, 5 pages (Sep. 2011).

Sailaja, Ch. et al., "Software Defined Radio for Underwater Applications using FPGA," IOSR Journal of VLSI and Signal Processing (IOSR-JVSP), vol. 4, Issue 5, Version II, 4 pages (Sep. 2014).

Santagati, G. Enrico and Tommaso Melodia, "Sonar Inside Your Body: Prototvping Ultrasonic Intra-body Sensor Networks," INFOCOM, 2014 Proceedings IEEE, 9 pages (Apr. 2014).

Schreiber, Anita, "Flexible Waveform Processing with the Xilinx Zynq-7000 Extensible Processing Platform," White Paper: Zynq-7000 EPPs, WP404 (v1.0.1), 10 pages (Mar. 6, 2012).

Sklivanitis, George, "Rapid prototyping of PHY/MAC-reconfigurable software-defined underwater acoustic modems with GNU Radio," Presentation in GNU Radio Conference (GRCon15), Washington. DC, USA, 28 pages (Aug. 2015).

Sozer. Ethem Mutlu et al., "Reconfigurable Acoustic Modem for Underwater Sensor Networks," Proc. of International Workshop on Underwater Networks (WUWNet '06), Berkeley, California (Sep. 25, 2006).

Steenkiste, Peter et al., "Enabling MAC Protocol Implementations on Software-defined Radios," PowerPoint, 16 pages (2009).

Torres. Dustin et al., "Software-Defined Underwater Acoustic Networking Platform," WUWNet '09 Proceedings of the Fourth ACM International Workshop on UnderWater Networks. Article No. 7, Berkeley, California (Nov. 2009).

(56) References Cited

OTHER PUBLICATIONS

Van den Bergh, Bertold et al., CLAWS: Cross-Layer Adaptable Wireless System enabling full cross-layer experimentation on real-time software-defined 802.15.4, EURASIP Journal on Wireless Communications and Networking 2014, 13 pages (2014).

* cited by examiner

METHOD AND APPARATUS FOR WIRELESS COMMUNICATIONS

RELATED APPLICATION(S)

This application is a continuation-in-part of U.S. application Ser. No. 15/791,181, filed Oct. 23, 2017, which claims the benefit of U.S. Provisional Application No. 62/411,185, filed on Oct. 21, 2016. The entire teachings of the above applications are incorporated herein by reference.

GOVERNMENT SUPPORT

This invention was made with government support under Grant No. CNS-1503609 from The National Science Foundation. The government has certain rights in the invention.

BACKGROUND

Networking technology plays a useful role in many commercial, scientific, and consumer activities. Existing networking technology has an ability to transmit at high-date rates using a given communications protocol.

SUMMARY

Embodiments of the present disclosure enable a networking device to transmit data at a high data rate and simultaneously change communications protocols or communications methods in real-time to adjust for a transition or change in a communications medium through which communications data units traverse.

Embodiments of the present disclosure are described in the context of underwater acoustic communications for explanatory purposes only. A person of ordinary skill in the art would recognize that the embodiments of the present disclosure, and the solutions presented herein, may be applied to any type of networking technology or networking device. For example, embodiments of the present disclosure may be used in any type of communications networks involving radio-frequency (RF) transmissions, acoustic transmissions, optical transmissions, or any other type of transmissions known in the art. The improvements to networking technology through embodiments disclosed herein are, however, particularly useful in underwater acoustic networks for the reason explained below. Additionally, the term "acoustic" should be understood to be inclusive of all acoustic waveforms, including ultrasonic waveforms.

Current underwater acoustic wireless communications platforms (i.e., existing underwater networking devices) are based on inflexible hardware that can only support point-to-point, low-data rate, and delay-tolerant applications. Existing underwater networking devices were designed to provide low-rate connectivity over long ranges (i.e., in the order of at least 1 km). Since attenuation in underwater channels increases exponentially with frequency, most modems operate over relatively low frequency bands to achieve longer ranges. Existing underwater networking devices often provide waveforms that achieve data rates lower than 20 kbit/s with a link distance of 1 km over horizontal links. Advanced applications like video streaming are largely impossible with current technology.

To summarize, the vast majority of existing underwater networking devices suffer from the following limitations.

Low Data Rates.

Because of the physics of underwater acoustic propagation, only acoustic waves at low frequencies (e.g., less than 30 kHz) can propagate over km-range distances. Therefore, existing underwater networking devices generate acoustic waves through low-frequency piezoelectric resonators, which are bulky and inevitably have limited bandwidth (i.e., in the order of a few kHz). However, when transmitting over shorter distances, as in many sensing and control applications of interest, it is useful to use wider bandwidths in the ultrasonic regime (e.g., up to 1-2 MHz) and generate wideband (multicarrier or impulsive) waveforms to communicate at higher data rates. However, distance-dependent optimizations of the waveform, which could enable data rates in the order of Mbit/s, are not possible with current underwater wireless technology. No existing underwater networking devices provide the flexibility to trade link distance for data rate.

Hardware-Based, Inflexible, and Proprietary Architectures.

In existing underwater networking devices, the physical layer, including all waveform generation functionalities, is implemented in hardware and is proprietary. Higher layers are often not even defined.

Narrowband and Bulky Transducers.

In existing underwater networking devices, bulk piezoelectric transducers are typically used to convert signals from the electrical to the acoustic domain. There are two main consequences. First, the achievable data rate is limited to a value equal to the product of the (small) bandwidth times the spectral efficiency achievable (i.e., a few kbit/s). Second, this lack of flexibility in the acoustic front end means that the networking device cannot implement dynamic spectrum access allocation schemes to switch to different frequency channels. This results in the networking device being hardware-tuned to a fixed acoustic channel and prevents a change frequency. Therefore, existing underwater networking devices lack the ability to react on a frequency-diversity or waveform-diversity basis to interference, jamming, or co-located transmissions.

Energy Inefficient.

Existing systems are energy inefficient, and the deployment of underwater networks is limited by battery lifetime. As of today, battery replacement is a complex issue that requires physically recovering a deployed network node.

Embodiments of the present disclosure are directed to addressing the above-referenced issues. For example, at least one embodiment of the present disclosure includes a high data rate, software-defined, underwater, acoustic networking platform (i.e., networking node/device) based on a single board providing a gate-level digital hardware module (e.g., a Field Programmable Gate Array, programmable logic, etc.) for low-level processing functionalities and a general purpose processor (e.g., a central processing unit), with more memory and more powerful processing capabilities than a typical microcontroller. The combination of the processor and the gate-level digital hardware module offers hardware and software re-programmability.

According to at least one example embodiment, the present disclosure may be implemented in the form of a method or corresponding apparatus for receiving or transmitting network communications carried at acoustic wavelengths via an acoustic medium. The corresponding method or apparatus according to one embodiment of the present disclosure includes a communications module configured to receive or transmit network communications carried at acoustic wavelengths via an acoustic medium, each of the network communications being defined by a communications protocol among multiple communications protocols.

The example embodiment may further include a gate-level digital hardware module communicatively coupled to the communications module and defining therein logic blocks configured to perform respective primitive processing functions, sequences of the logic blocks being capable of processing data units in accordance with any of the multiple communications protocols on a data unit-by-data unit basis without reconfiguring. According to some embodiments, the gate-level digital hardware module may be configured to process a data unit in accordance with a first communications protocol by directing the data unit through a first sequence of logic blocks, and process a subsequent data unit in accordance with a second communications protocol by directing the subsequent data unit through a second sequence of logic blocks.

In some embodiments, the communications module may be a first of a plurality of communications modules. Further, the digital hardware module may be configured to be communicatively coupled to a second communications module in place of the first communications module, thereby enabling the digital hardware module to swap between the plurality of communications modules. The first communications module may be configured to receive or transmit network communications in accordance with the first communications protocol, and wherein the second communications module is configured to receive or transmit network communications in accordance with the second communications protocol. The first and second communications protocols may correspond to distinct frequency bands, meaning that the communications modules may be swapped to provide the node with communications capacity over a greater frequency range.

In further embodiments, the digital hardware module may include one or more software modules configured as at least one software block, and the digital hardware module may be configured to access the at least one software block in the first sequence of logic blocks. The digital hardware module may be configured to access a software module to process the data units before, after, or between at least two of the logic blocks within the first sequence of logic blocks or the second sequence of logic blocks.

According to at least one other embodiment, the gate-level digital hardware module may include a router defined therein to direct each data unit through respective sequences of logic blocks. In some embodiments, each data unit includes a header specifying a sequence of logic blocks the respective data unit is to be directed along for processing in accordance with a corresponding communications protocol, and each logic block is configured to direct each data unit to a next logic block or to an output port according to the respective sequence specified in the header of the data unit.

Some embodiments of the present disclosure further comprise a processor communicatively coupled to the gate-level digital hardware module and configured to select a communications protocol from among the multiple communications protocols, and communicate application data and the selected communications protocol to the gate-level digital hardware module. In some embodiments, the gate-level digital hardware module is further configured to convert the application data into a data unit including a header specifying a sequence of logic blocks the data unit is to be directed along for processing according to the selected communications protocol.

According to some embodiments, the gate-level digital hardware module is further configured to receive a data unit from a transmitter device, and assign a header to the received data unit specifying a sequence of logic blocks the received data unit is to be directed along for processing according to a communications protocol.

According to some embodiments, the gate-level digital hardware module utilizes a multiplexing source and a multiplexing sink defined therein to direct each data unit through respective sequences of logic blocks.

In some embodiments, each sequence of logic blocks corresponds to a communications protocol, and different sequences of logic blocks correspond to different communications protocols.

Embodiments of the present disclosure can transmit and receive multiple communications protocols including, but not limited to, any of the following communications protocols: orthogonal frequency-division multiplexing, code-division multiple access, time-division multiple access, frequency-hopping spread spectrum, time-hopping spread spectrum, direct sequence spread spectrum, binary chirp spread-spectrum, and a chirp-based communications protocol.

Some embodiments of the present disclosure further include a sensor configured to sense an aspect of the acoustic medium, the processor being coupled to the sensor and further configured to notify another node to change the communications protocol to a next communications protocol more suitable for a sensed change in the acoustic medium. The processor may be further configured to change the configuration parameters as a function of sensed changes of the acoustic medium to enable the logic blocks to process data units of the next communications protocol. In some embodiments, the sensor may be a: temperature sensor, depth sensor, salinity sensor, motion sensor, video camera or other optical sensor, acoustic sensor, and attitude sensor, or combination thereof.

In some embodiments, the first communications protocol or the second communications protocol may be a chirp-based communications protocol based on transmitting chirp signals spread over a multidimensional domain spanning code, time, and frequency. In some embodiments, the chirp-based communications protocol may involve chirp-based acoustic pulses with ultrasonic spectral content following a frequency-hopping and time-hopping pattern with a superimposed spreading code.

According to some embodiments, the processor may execute software-defined functionalities and define reconfigurable high-level networking protocols (i.e., non-time critical Media Access Control (MAC) functionalities, network, application). In some embodiments, the gate-level digital hardware module controls the physical layer and time-critical MAC layer functionalities. In this way, processing-intensive physical layer functionalities are software-defined, but executed in hardware that can be reconfigured in real-time (using the registers or router of the gate-level digital hardware module, or through partial reconfiguration of the gate-level digital hardware module). Therefore, unlike purely software-defined implementations that introduce high processing latency, which, in turn, limit data rates and unlike pure hardware implementations that lack reconfiguration capabilities, embodiments of the present disclosure are able to provide the low latency and high-data-rate characteristics of hardware implementations, as well as the reconfiguration capabilities of software implementations.

Additionally, embodiments of the underwater networking platform may utilize novel acoustic transmission schemes for stealthy underwater communications discussed in detail below. These acoustic transmission schemes (i.e., communications protocols) include chirp-based LPD/LPI underwater acoustic communications with code-time-frequency multidimensional spreading based on transmitting chirp signals that are spread over a multidimensional domain spanning code, time, and frequency. This results in higher LPD/LPI performance compared to protocols that consider only a single dimension (i.e., code or frequency), and provides a hopping-coding pattern that is not easily recognizable or detectable. Moreover, chirp signals are ubiquitous in the underwater environment (e.g., dolphin clicks), and are not easy for an adversary to detect and associate the chirps with a communications system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4A-2 depicts example transmitter sequences and example receiver sequences.

Figure 1A:
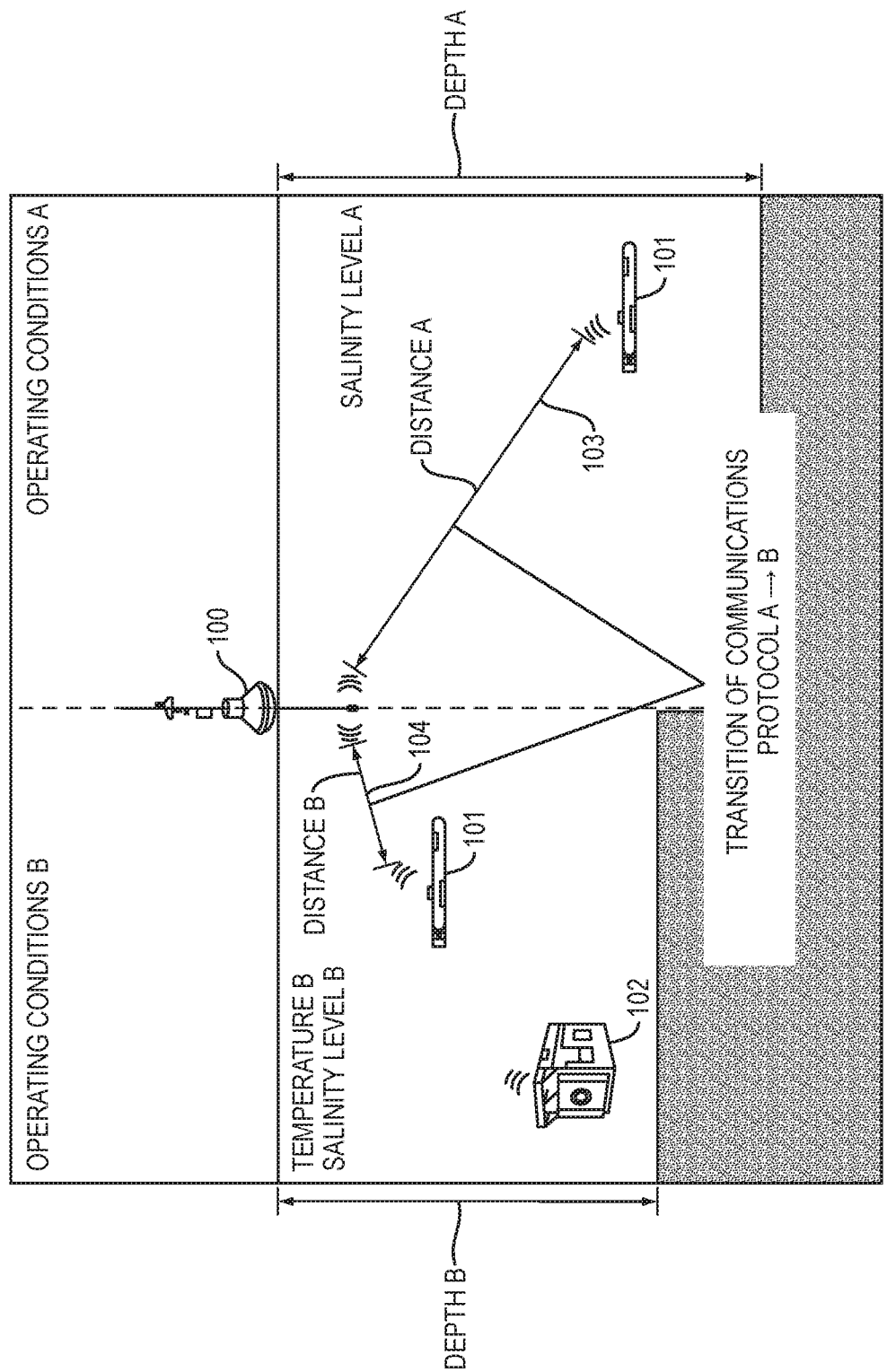
FIG. 1A illustrates an example of an underwater acoustic wireless communications platform that is configured to change communications protocols in a seamless manner based on operating conditions.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Embodiments of the present disclosure include underwater wireless technology capable of short-range (i.e., up to 500 m), high-rate, wireless connectivity for unmanned vehicles, scuba divers, and other equipment in areas with underwater infrastructure (e.g., oil rigs) and/or base stations that act as gateway between radio frequency (RF) and acoustic domains. Accordingly, some embodiments are based on orthogonal frequency-division multiplexing (OFDM) schemes (discussed in detail below) and implement resource allocation schemes that assign dynamically time-frequency blocks to devices based on distance, channel, traffic, and other factors.

FIG. 1A illustrates an example of an underwater acoustic wireless communications platform 100 changing communications protocols based on operating conditions. Underwater acoustic communications may be affected by operating conditions, such as distance, depth, temperature, salinity, noise and other traffic; and different communications protocols may be better suited for different operating conditions. Embodiments of the present disclosure enable the underwater acoustic wireless communications platform 100 and other devices or vehicles 101, 102 using underwater communications systems to reconfigure processing-intensive physical layer functionalities in hardware during runtime to adapt to changing operating conditions. This allows the underwater acoustic wireless communications platform 100 and other devices or vehicles 101, 102 to select a communications protocol to optimize acoustic communications in real-time, without sacrificing the processing speed of hardware-based architectures.

In FIG. 1A, the underwater acoustic wireless communications platform 100 is depicted as communicating with an underwater device 101 under different operating conditions (i.e., operating conditions A and B). For example, the underwater acoustic wireless communications platform 100 may select a first communications protocol 103 to communicate data to the underwater device 101 based on operating conditions A. The selection of the first communications protocol 103 may be based on one or more of the operating conditions (e.g., distance A, depth A, temperature A, lack of other acoustic traffic, salinity level A, etc.). The selection of a communications protocol may be performed based on an algorithm or logic taking into account one or more operating conditions. In some embodiments, the selection may be performed by a general purpose processing unit or a gate-level digital hardware module. In some embodiments, the selection may be based on an input from an external source.

As the underwater device 101 moves to a new position, the operating conditions may change, prompting the underwater acoustic wireless communications platform 100 to select a second communications protocol 104 to communicate data to the underwater device 101 based on operating conditions B. Again, the selection of the second communications protocol 104 may be based on one or more of the operating conditions (e.g., distance B, depth B, temperature B, presence of other acoustic traffic (underwater device 102), salinity level B, etc.).

It should be understood that a command or handshaking may be employed by the platform 100 to cause the underwater device 101 to change its protocol. It should also be understood that the underwater device 101 may signal the platform 100 to change communications protocol. Because embodiments of the invention enable changing communications protocols on a data unit-by-data unit basis, as described in detail below, the change in communications protocol can be performed in real-time, thereby providing a seamless transition.

Further, embodiments of the present disclosure may alter parameters of the communications separate from the selection of a new communications protocol. For example, as the distance between the underwater acoustic wireless communications platform 100 and the underwater device 101 becomes smaller, the underwater acoustic wireless communications platform 100 may perform a distance-dependent optimization. One such distance-dependent optimization may be increasing the frequency of the acoustic waves as the underwater device 101 moves closer to the underwater acoustic wireless communications platform 100. Longer distances require acoustic waves with low frequencies in order for the acoustic waves to propagate over the longer distances. However, when transmitting over shorter distances, it may be useful to use wider bandwidths in the ultrasonic regime and generate a wideband (multicarrier or impulsive) waveform, which, in turn, enables higher data rates. The runtime alteration of frequency allows the underwater acoustic wireless communications platform 100 to maximize the data rate based on distance to the underwater device 101.

Figure 1B:
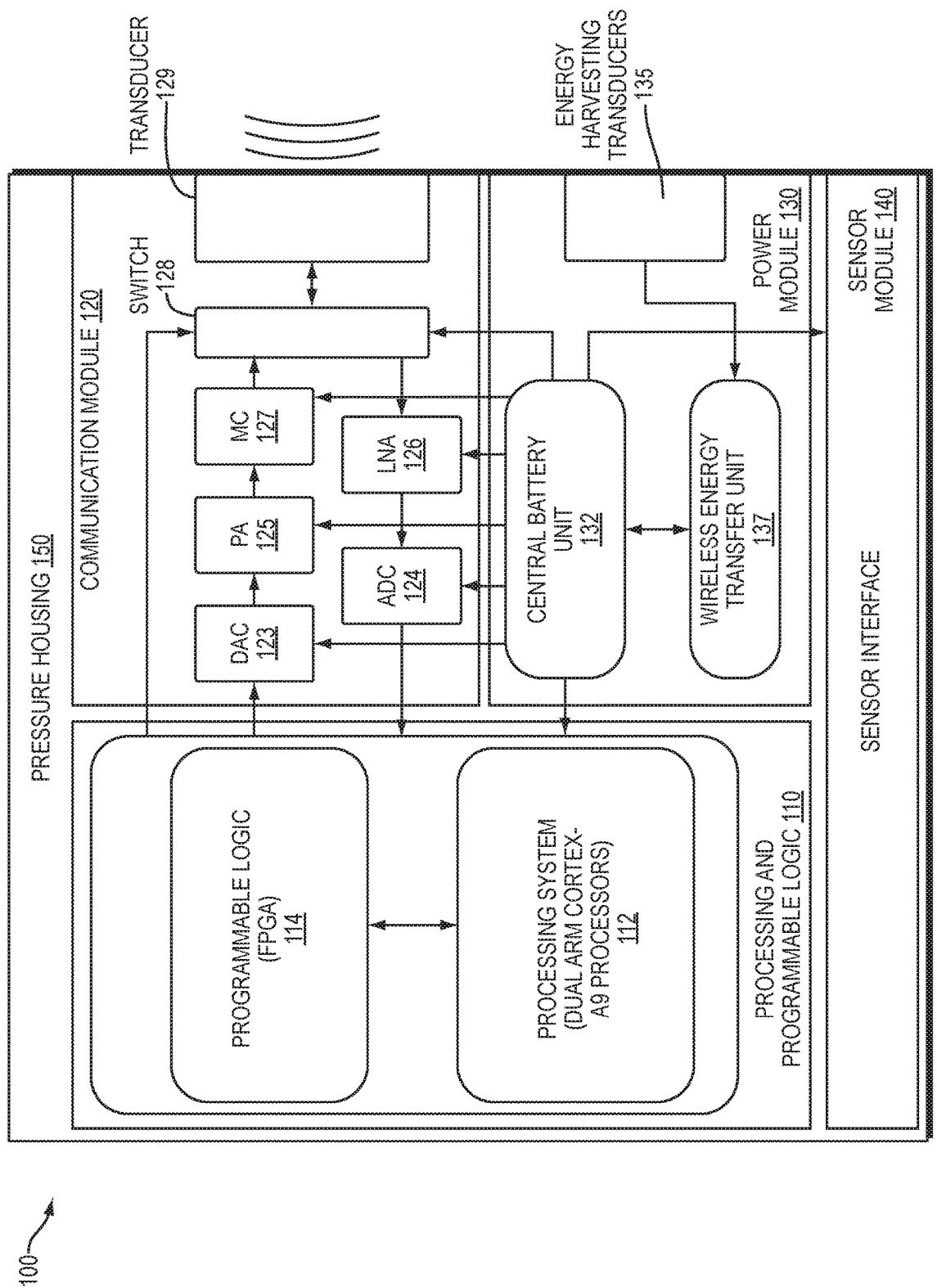
FIG. 1B illustrates the hardware architecture of an underwater acoustic wireless communications platform.

Existing hardware-based networking devices are inflexible, and not capable of switching communications protocols during runtime (i.e., in real-time) when operating conditions change. Purely software-defined networking devices may have the capability to change communications protocols during runtime, but do not possess the processing capabilities of hardware-based networking devices. Embodiments of the present disclosure, as described in detail below, provide the flexibility of software-defined networking devices with the processing capabilities of hardware-based networking devices. FIG. 1B illustrates the hardware architecture of an example underwater acoustic wireless communications platform 100 (i.e., a network node). According to some embodiments, the underwater acoustic wireless communications platform 100 may include one or more modules held in a pressure housing 150. The example embodiment illustrated in FIG. 1B comprises four modules: a processing and programmable logic module 110, a communications module 120, a power module 130, and a sensor module 140. In some embodiments, the modules may have distinct, non-overlapping functionalities, and each module may be interfaced to the other modules through standard interfaces. This enables the modules to be swappable and upgradeable, and, in this way, the underwater acoustic wireless communications platform 100 can provide hardware evolution and reconfiguration to support the needs of different applications adequately.

According to some embodiments, the processing and programmable module 110 incorporates a general purpose processing unit 112 (e.g., CPU, or ARM processing system) and a gate-level digital hardware component 114 (e.g., a field programmable gate array (FPGA), programmable logic, etc.) on a single-board. The combination of the general purpose processing unit 112 and the gate-level digital hardware component 114 provides hardware and software re-programmability.

According to some embodiments, the general purpose processing unit 112 is the heart of the processing system and includes on-chip memory, external memory interfaces, and a rich set of peripheral connectivity interfaces. The architecture of the processing and programmable module 110 provides the combined benefits of (i) an microcontroller that can run an operating system and be programmed through high-level languages (e.g., C++, Python, etc.); and (ii) a gate-level digital hardware component 114 to enable hardware reconfiguration (offline or during runtime) in support of different physical layer protocols and other computationally-intensive data processing operations without sacrificing energy efficiency. The architecture of the processing and programmable module 110 also provides low latency, high throughput, and cache-coherent communications between the gate-level digital hardware component 114 and the processing unit 112. In this way, processing-intensive functionalities can be software-defined while being executed in hardware (gate-level digital hardware component 114). This enables an underwater acoustic wireless communications platform 100 to run functionalities with low latency and still be able to perform reconfiguration in real-time (i.e., during runtime) through registers and partial reconfiguration of the gate-level digital hardware component 114.

According to some embodiments, the general purpose processing unit 112 may include a set of I/O peripherals, including two I2C blocks that can operate both as master and slaves, and a plurality of general purpose input output (GPIO) pins to enable connectivity with virtually any sensors, data converters, and memories. In some embodiments, the general purpose processing unit 112 may be connected to the gate-level digital hardware component 114 through a multilayered advanced microcontroller bus architecture (AMBA) advanced eXtensible interface (AXI) interconnect, which enables multiple simultaneous and continuous data flows.

In some embodiments, the general purpose processing unit 112 executes software-defined functionalities to define reconfigurable high-level networking protocols (i.e., non-time critical MAC functionalities, network, and application). The general purpose processing unit 112 may also execute application-specific functionalities. In some embodiments, the gate-level digital hardware component 114 may execute physical layer and time-critical MAC layer functionalities. In this way, processing-intensive physical layer and time-critical MAC functionalities are software-defined, but executed in hardware that can be reconfigured in real-time (e.g., see FIG. 4A, FIG. 4B, FIG. 4C and each figure's accompanying description).

According to some embodiments, the gate-level digital hardware component 114 may include logic blocks configured to perform respective primitive processing functions. These logic blocks themselves may include reconfigurable hardware circuitry that can be individually reconfigured to perform different primitive processing functions. In other words, each logic block itself may be reconfigured to perform a different task (primitive processing function). However, a logic block itself cannot be reconfigured while the logic block is processing data. Reconfiguration of the logic block themselves require each logic block be taken offline to be reconfigured. Embodiments of the present disclosure avoid reconfiguring logic blocks to perform different tasks by directing data units to different logic blocks and/or a different order of logic blocks.

It should be noted that adjusting the parameters of a logic block does not necessarily require reconfiguring the logic to alter the task the logic block performs. According to some embodiments of the present disclosure, registers within the gate-level digital hardware component 114 may store and adjust logic block configuration parameters during runtime (in real-time) including parameters such as modulation, coding rate, guard time, subcarrier mapping, number of ZP-OFDM symbols in a data unit. The adjustment of parameters does not require reconfiguring logic blocks to perform different tasks.

In some embodiments, the gate-level digital hardware component 114 may process data by directing the data through a consecutive sequence of logic blocks (i.e., from one logic block to the next logic block), each logic block performing a primitive processing function, and the collective sequence of logic blocks performing a complex processing task.

Example logic blocks include Fast Fourier Transform (FFT), Inverse FFT (IFFT), FIR filter, Interleaver, De-Interleaver, Scrambler, De-Scrambler, Cyclic Redundancy Check, Convolution Encoder/Decoder, Cyclic Prefix, Carrier Frequency Offset Correction, Pulse Shaping, Forward Error Coding, Automatic Gain Control, and logic blocks that perform Symbol Mapping/Demapping (e.g., Binary Phase Shift Keying, Quadrature Phase Shift Keying, Quadrature Amplitude Modulation).

According to some embodiments, the gate-level digital hardware component 114 may change the hardware-level complex processing being performed on a data in real-time by changing the consecutive sequence of logic blocks the data is being directed through. This enables the gate-level digital hardware component 114 to change the processing being executed by its hardware during runtime (e.g., on a data unit-by-data unit basis) without requiring a reconfiguration of the logic blocks themselves.

For example, in some embodiments, the complex processing task performed by a collective sequence of logic blocks may be processing units of data (e.g., data frames, data packets, etc.) according to a communications protocol. By changing the collective sequence of logic blocks, the gate-level digital hardware component 114 may change the communications protocol for the subsequent units of data. Thus, this change in communications protocol can be performed on a data unit-by-data unit basis without requiring a reconfiguration of the logic blocks themselves.

According to some embodiments, the gate-level digital hardware component 114 may include up to 53,000 look-up-tables (LUTs), 85,000 logic cells, and 220 DSP slices in a chip scale package (17×17 mm). The gate-level digital hardware component 114 may further include a set of digital signal processing (DSP) functional logic blocks, thereby enabling the general purpose processing unit 112 to off-load computationally expensive MCU operations to the gate-level digital hardware component 114.

According to some embodiments, the communications module 120 enables acoustic wireless connectivity through data converters, power/low-noise amplifiers, and an acoustic transducer 129. In some embodiments, the acoustic transducer 129 may be a receiver hydrophone with an operational frequency range from 1 Hz to 170 kHz. The transducer may have a flat receiving sensitivity of −211 [dB re 1V/µPa at 1 m] over the operational frequency range, and a maximum transmit sensitivity of 130 [dB re 1 µPa/V at 1 m] at 100 kHz. The transducer may produce a directivity pattern that is omnidirectional in the horizontal axis and 270° in the vertical axis.

According to some embodiments, the communications module 120 may include two transducers, each transducer operating on different parts of the acoustic spectrum. In addition to the transducer described above, the communications module 120 may include a second transducer with an operational frequency range from 10 kHz to 800 kHz. This transducer was selected to operate over portions of the spectrum that above transducer is not able to cover. The second optional transducer may have a receiving sensitivity of −228 [dB re 1V/µPa at 1 m] that is relatively flat over the operational frequency range and transmitting sensitivity of 138 [dB re 1 µPa/V at 1 m] at 700 kHz. Moreover, the second optional transducer may have omnidirectional horizontal and 60°-120° vertical directivity patterns.

In some embodiments, the communications module 120 includes a transmitter (Tx) chain 121 and a receiver (Rx) chain 122. The Rx chain 122 may include a low-noise amplifier (LNA) 126 and an analog-to-digital converter (ADC) 124 to amplify and digital-convert received signals. The Tx chain 121 may include a digital-to-analog converter (DAC) 123 and a power amplifier (PA) 125 to analog-convert and amplify the digital waveforms before transmission. In some embodiments, the Tx chain 121 may also include a matching circuitry (MC) 127 to match the input impedance of the acoustic transducer 129 with the output impedance of the PA 125 to minimize the amount of signal that is reflecting back to the PA 125 and not transmitted.

According to some embodiments, the communications module 120 further includes an electronic switch 128 that enables the use of a single acoustic transducer 129 for both transmitting and receiving acoustic signals in a time-division fashion.

In some embodiments, the communications module can alternatively be a radio frequency (RF) communications module, or any other type of communications module (e.g., optical, etc.). Some embodiments of the underwater acoustic wireless communications platform 100 may include multiple different communications modules. For example, the underwater acoustic wireless communications platform 100 may include both a RF communications module and an acoustic communications module, enabling the underwater acoustic wireless communications platform 100 to function as a gateway between an underwater area network and RF network.

Some embodiments may implement architecture that defines and standardizes interfaces between different components/modules and provide the flexibility to define, add, update, and swap components/modules. In this way, the architecture may support seamless integration with different transducers operating over diverse spectrum bands through swappable front-ends/communication modules.

Developing front-ends/communication modules and transducers that can operate over all frequencies (e.g., spanning from 1 Hz to 10 MHz) with the same efficiency is still an open problem. To address this problem, example embodiments may include multiple communication modules covering different portions of the desired frequency band. The communication modules can be swapped or switched without requiring any hardware modifications as a result of their standard interfaces. Similarly, through the standard interfaces, the communication modules can also be integrated with different transducers without requiring any hardware modifications. Furthermore, multiple communication modules can be housed and connected in parallel to the same processing and programmable logic (main module). In this way, operational over larger frequency bands (in the order of MHz) is achieved as well as the capabilities to implement Multiple-Input-Multiple-Output (MIMO) and beamforming operations.

Referring back to FIG. 1B, according to some embodiments, the power module 130 may include a central battery unit 132 that provides power to the underwater acoustic wireless communications platform 100. In some embodiments, the power module 130 may further include one or more energy harvesting transducers 135 interfacing with a wireless energy transfer unit 137 that enables the central battery unit 132 to be recharged wirelessly through acoustic waves.

According to some embodiments, the sensor module 140 provides an interface for several different sensors through either standard analog interfaces, such as ADC, or digital interfaces, such as Serial Peripheral Interface (SPI).

Figure 2:
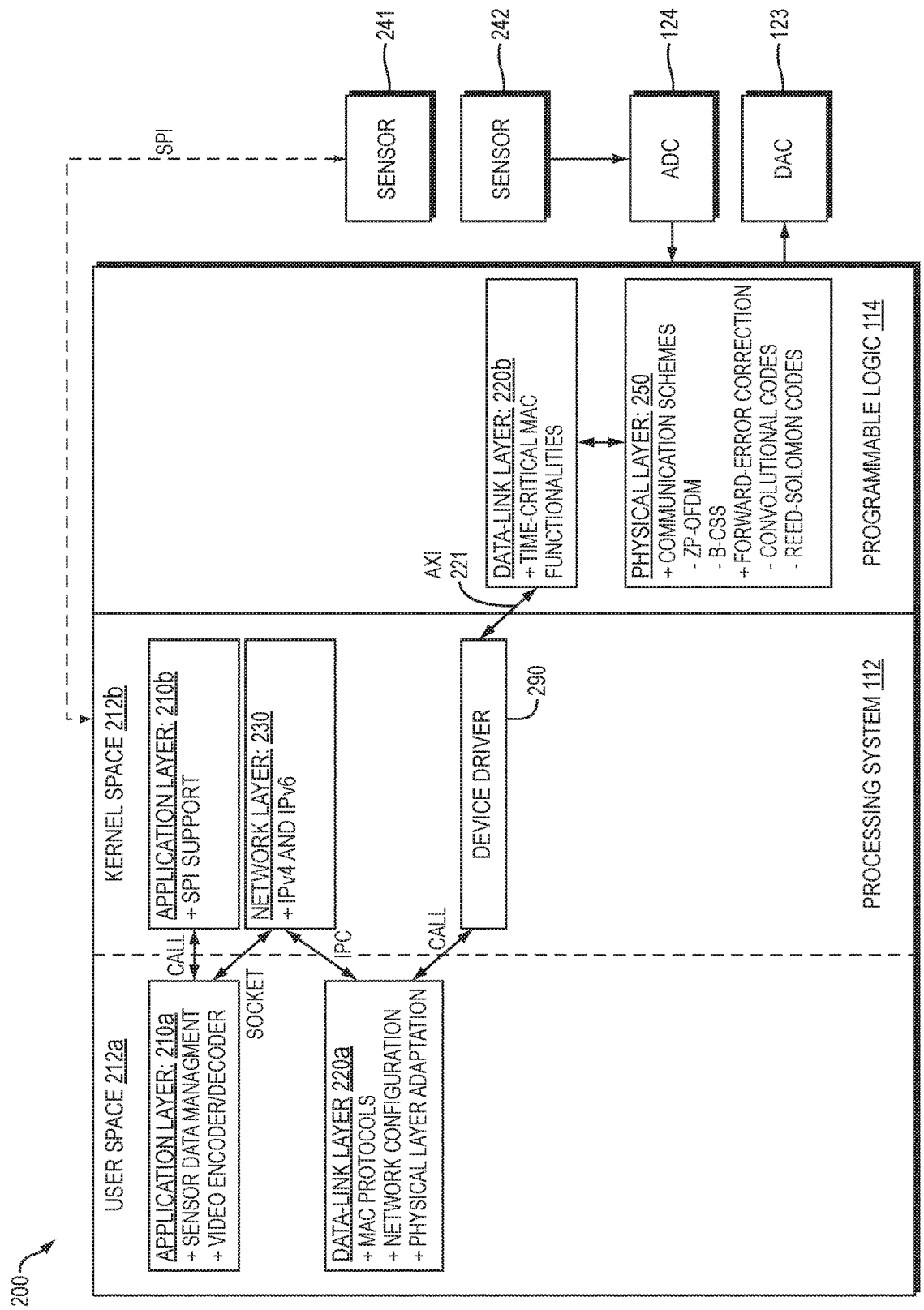
FIG. 2 illustrates an example software architecture for a processing and programmable logic module.

FIG. 2 illustrates an example software architecture 200 for the processing and programmable logic module 110, according to some embodiments. In some embodiments, the software architecture 200 may depend on the operating system (e.g., Linux) running on the general purpose processing unit 112 and communicating with the gate-level digital hardware component 114 using advanced eXtensible interface (AXI) 221. In some embodiments, all physical layer 250 functionalities as well as the time-critical MAC functionalities may be implemented in the gate-level digital hardware component 114, while non-time critical MAC, network, and application layer 210a, 210b functionalities may be executed on the general purpose processing unit 112.

According to some embodiments, the software architecture 200 may include a physical layer 250 comprising logic blocks and libraries for processing data in accordance with different communications protocols and forward error correction (FEC) techniques. Specifically, the communications protocols may include a Zero-Padded Orthogonal Frequency-Division-Multiplexing (ZP-OFDM) protocol and a Binary Chirp Spread-Spectrum (B-CSS) protocol, and the error correction techniques may include Reed-Solomon (RS) codes and convolutional codes.

In some embodiments, the physical layer 250 includes logic blocks configured to perform respective primitive processing functions. For example, these primitive processing functions may include symbol mapping, Fast Fourier Transform (FFT), as well as filters to enable fast implementation and prototyping of new physical layer protocols.

According to some embodiments, the software architecture 200 may host a set of data-link layer libraries (220a and 220b) implementing different MAC protocols, network topology configurations, and physical layer adaptation mechanisms. The data link layer 220a of the general purpose processing unit 112 may implement the non-time critical MAC protocols, and the data-link layer 220b of the gate-level digital hardware component 114 may implement the time-critical MAC functionalities.

In some embodiments, the data link layer 220a may implement different MAC protocols, including Carrier Sense Multiple Access with Collision Avoidance (CSMA/CA) and ALOHA, as well as a set of primitive functions, including retransmissions, timers, checksum-based error control, and idle listening, to enable the implementation of different MAC protocols (e.g., time-division multiple access (TDMA) based protocols such as slotted floor acquisition multiple access (FAMA)).

CSMA/CA is a medium access control (MAC) technique that depends on a carrier sensing mechanism for preventing collisions with on-going transmissions. Specifically, when a network node starts a data transmission, it first senses the medium for a certain amount of time (in the order of inter-frame space duration). When the network node senses the medium continuously idle, it starts the transmission process. However, CSMA/CA is known to be less effective because of the long propagation delays in the UW-A channel, but CSMA/CA can be a viable option for very short or short communication links.

ALOHA is a medium access control protocol based on random access. If a network node wants to transmit a packet, it accesses the medium without sensing. Each successful transmission is acknowledged by the receiver; otherwise, the transmitter node concludes that a collision has occurred. In this case, the transmitter waits for a random time interval (i.e., back off time) and retransmits the packet. Embodiments of the present disclosure offer the flexibility and real-time reconfiguration capability to switch between different protocols depending on the transmission scenario. This enables embodiments of the present disclosure to switch seamlessly between multiple MAC protocols on a data unit-by-data unit basis to maximize the attributes of the multiple MAC protocols.

In some embodiments, the data link layer 220a can support different network topology configurations. For example, the data link layer 220a of the software architecture 200 may support network nodes of underwater acoustic network (UAN) devices that can operate in networks with both centralized and decentralized control. In networks with centralized control, one network node is assigned to be the central (master) node, and the central node coordinates the rest of the network nodes.

According to some embodiments, the central node (e.g., the underwater acoustic wireless communications platform 100) may have higher computational and memory resources than the other network nodes (e.g., sensors equipped with a transmitter and/or a receiver). In some embodiments, the central node might also take the role of gateway between underwater acoustic and terrestrial networks, in which case the central node supports RF communications in addition to acoustic communications capability. For example, such a configuration can be used for UAN applications that require real-time and continuous monitoring, where the data collected in the network is sent to the central node. Subsequently, the central node transfers the collected data to a shore station or a database through its RF communications module.

In some embodiments, the data link layer 220a can also support network configurations with decentralized control, where each network node acts as a peer without the control of any central identity. Such configurations can be useful in UAN applications to reach higher ranges or save energy by exploiting multi-hop links.

Referring back to FIG. 2, according to some embodiments, the data link layer 220a may incorporate a physical layer adaptation mechanism that provides network nodes with the capability to adapt/change in real-time their respective physical layer scheme. For example, the physical layer adaptation mechanism enables network nodes to change the modulation, FEC coding rate, guard interval size, and symbol duration of their physical layer schemes. Further, according to some embodiments, the software architecture 200 can perform cross-layer adaptation that allows network layers 230 and data-link layers 220a and 220b to reconfigure physical layer 250 parameters. As a result, the software architecture 200 can define different decision methods to adapt its behavior based on the current channel requirements and different application needs.

Figure 8A:
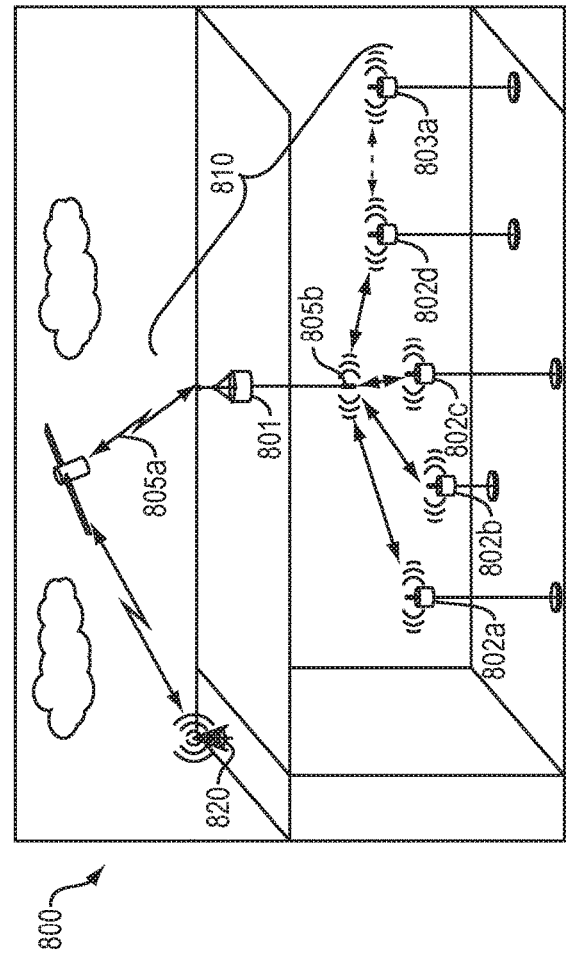
FIG. 8A illustrates an example hybrid network topology with centralized and decentralized control.

According to some embodiments, the software architecture 200 includes a network layer 230 to support IPv4 and IPv6 protocols through an adaptation layer that provides IP header compression, IP packet fragmentation, and optimizes the traditional IPv4 and IPv6 headers for underwater acoustic channels to minimize the overall network delay and energy consumption. Additionally, because the network layer 230 of the software architecture 200 supports IPv4 and IPv6 protocols, network nodes in UANs incorporating the software architecture 200 are able to interoperate with traditional IP networks. For example, such interoperation is illustrated in FIG. 8A between underwater acoustic network 810 and terrestrial network 820 (which may be a traditional IP network).

Referring back to FIG. 2, according to some embodiments, the software architecture 200 includes an application layer 210a to support different operational needs. For example, the application layer 210a can configure network nodes to operate either as a sink node, which collects data from the network, as a source node, which sends its sensed data to another network node, or as a relay node that forwards collected data to another network node. In some embodiments, the application layer 210a includes video encoders and decoders for supporting real-time video transmission. Additionally, the application layer 210a may be implemented to port data to and from existing applications previously developed in the operating system's environment.

According to some embodiments, the software architecture 200 includes an application layer 210b to provide support for interfacing different sensor units (241 and 242), either through ADCs in the analog domain 244, or through the digital domain 243 with standard serial communications protocols (e.g., SPI).

Figure 3A:
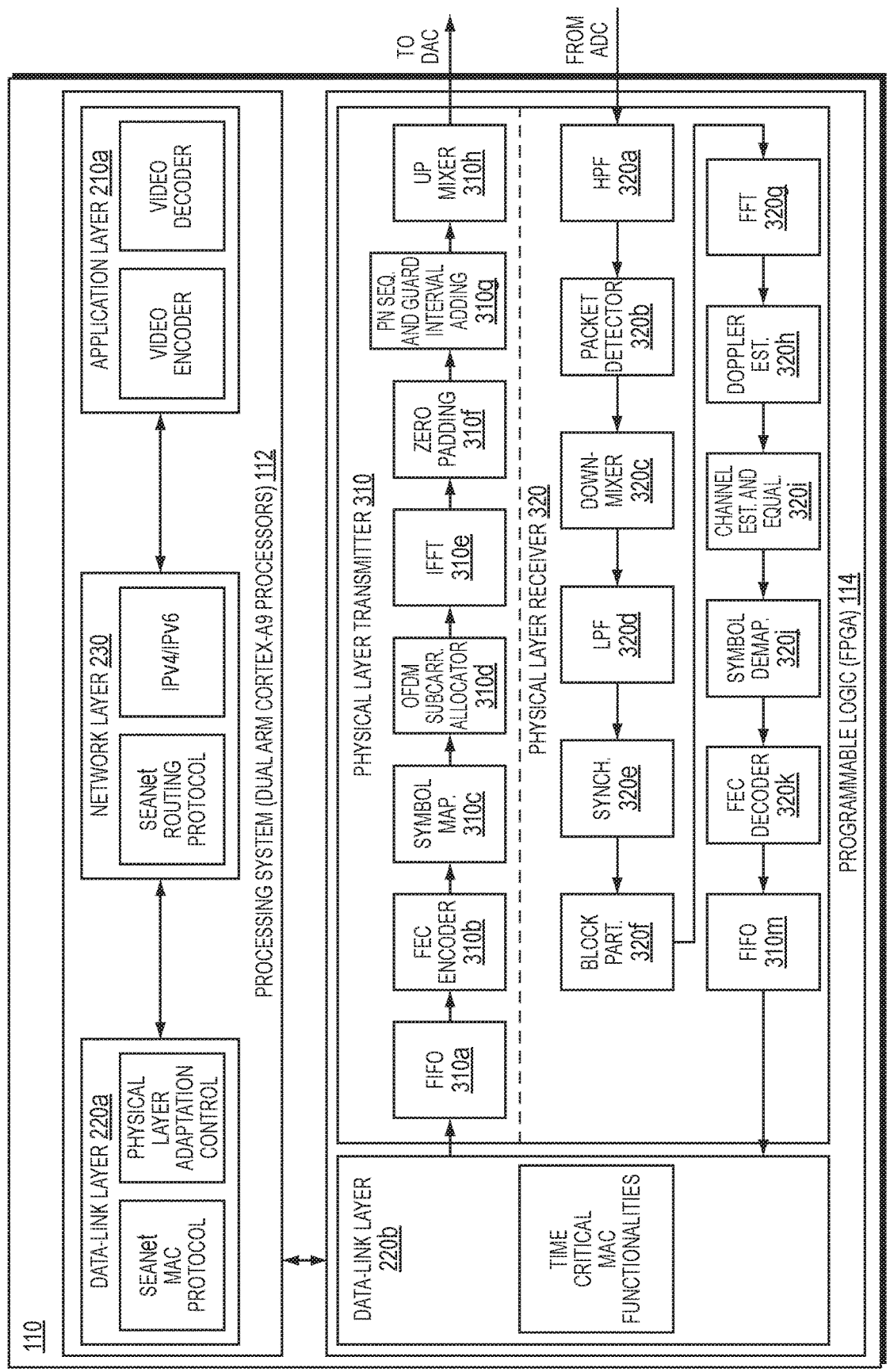
FIG. 3A illustrates an example embodiment of the processing and programmable logic module implementing a Zero-Padded Orthogonal Frequency-Division-Multiplexing (ZP-OFDM) communications protocol.

As stated above, according to some embodiments, the underwater acoustic wireless communications platform 100 may utilize the software architecture 200. FIG. 3A illustrates an example embodiment of the processing and programmable logic module 110 implementing a Zero-Padded Orthogonal Frequency-Division-Multiplexing (ZP-OFDM) communications protocol. Similarly, FIG. 3B illustrates a block diagram of the physical layer 250 of the processing and programmable logic module 110 implementing a ZP-OFDM communications protocol.

According to some embodiments, the ZP-OFDM communications protocol defines a packet format where N OFDM symbols are preceded by a preamble packet that is used for packet detection and coarse time synchronization. In some embodiments, the ZP-OFDM communications protocol includes two types of preamble blocks, pseudo-noise (PN)-sequence blocks and chirp blocks.

According to some embodiments, the gate-level digital hardware component 114 instantiates ZP-OFDM transmitter logic blocks 310a-h, ZP-OFDM receiver logic blocks 320a-m, registers 330, an AXI4-Lite interface 302, and an AXI Direct Memory Access (DMA) interface 301 and 303. DMA enables continuous data flow to the DAC 123 without the involvement of the processor processing unit 112. In some embodiments, the gate-level digital hardware component 114 includes a plurality of logic blocks for one or more communications schemes, and among the plurality of logic blocks are the ZP-OFDM transmitter 310 logic blocks 310a-h and ZP-OFDM receiver 320 logic blocks 320a-m. The gate-level digital hardware component 114 may include other logic blocks not needed to implement the ZP-OFDM communications protocol, but are available to the gate-level digital hardware component 114 if the communications protocol should be altered.

Figure 3B:
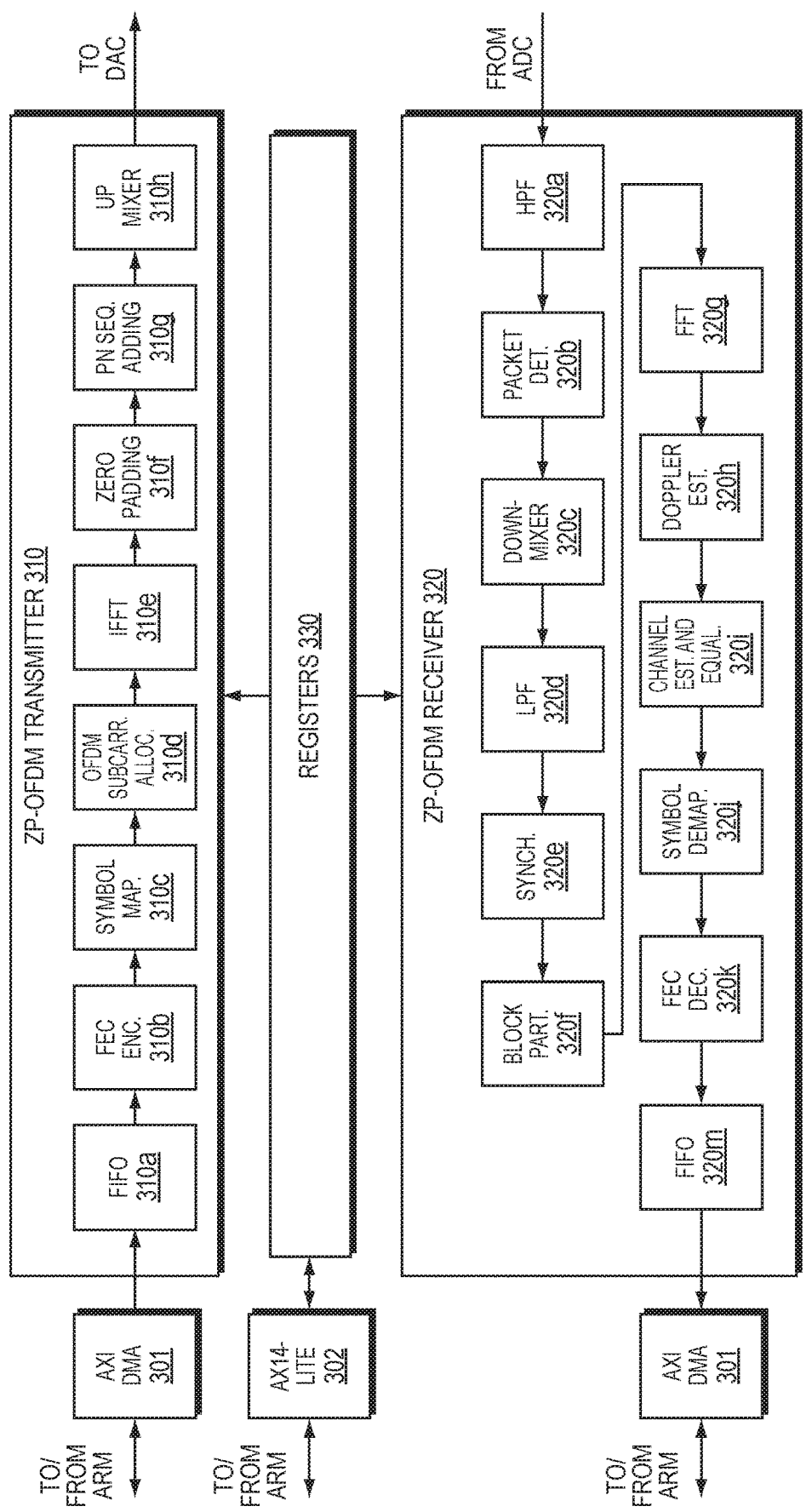
FIG. 3B illustrates a block diagram of the physical layer of a processing and programmable logic module implementing the ZP-OFDM communications protocol.

According to some embodiments, a sequence of logic blocks 310a-h corresponding to the ZP-OFDM transmitter 310 is depicted in FIG. 3A and FIG. 3B. In some embodiments, the general purpose processing unit 112 sends data units (i.e., information bits or a sequence of information bits) to the input first in, first out (FIFO) logic block 310a of ZP-OFDM transmitter sequence 310 through AXI DMA interface 301. In other embodiments, the data units may be received by the FIFO logic block 310a from another source or via another type of interface. The inputted data units may then be directed to the Forward-Error-Correction (FEC) encoder (i.e., convolutional encoder, turbo encoder, etc.) logic block 310b to be encoded. Next, the encoded data units are passed to the symbol mapping logic block 310c, wherein the encoded data units are mapped into symbols according to a selected modulation scheme.

In some embodiments, the gate-level digital hardware component 114 may further include other FEC encoder logic blocks or symbol mapping logic blocks. The other FEC encoder logic blocks or symbol mapping logic blocks may differ in some respect, for example the other FEC encoder logic block may use a different coding scheme or the other symbol mapping block may have a different modulation scheme. By having access to multiple logic blocks that perform the same overall function, but perform that overall function differently, the gate-level digital hardware component 114 may change attributes of the ZP-OFDM transmitter by directing data units to the alternate logic blocks on a data unit-by-data unit basis. One of skill in the art would recognize that this flexibility and configurability could be applied to any type of logic block, performing any type of primitive processing functions.

Referring back to FIG. 3A and FIG. 3B, according to some embodiments, the symbols generated from the encoded data units are directed to the OFDM subcarrier allocation logic block 310d, where they are allocated to different subcarriers alongside with pilot and null subcarriers based on a predefined scheme to form the OFDM symbols. Next, the formed OFDM symbols are then directed to the inverse fast Fourier transform (IFFT) logic block 310e to be translated to the time-domain. The output of the IFFT logic block 310e is then directed to the zero-padding logic block 310f to generate ZP-OFDM symbols. The generated ZP-OFDM symbols are directed to the pseudo-noise (PN) sequence logic block 310g where they are translated into a packet format, which includes a preamble (PN sequence) and NZP-OFDM symbols. Next, the generated packets are directed to an up mixer logic block 310h, where they are up-converted to the pass-band frequency and sent to the DAC for being converted to the analog domain and transmitted.

A sequence of logic blocks 320a-m corresponding to the ZP-OFDM receiver 320 is depicted in FIG. 3A and FIG. 3B, according to some embodiments. In some embodiments, the gate-level digital hardware component 114 may receive signals from the ADC. The received symbols may be first fed into a high-pass filter (HPF) logic block 320a to eliminate DC offset and out-of-band noise. Next, the filtered signals may be directed to a packet detector logic block 320b that performs an energy-level collection based method for packet detection. Next, the detected packets may be directed to a down-mixer logic block 320c to be down-converted into baseband signals. The baseband signals may then be directed to a low-pass filter (LPF) logic block 320d to eliminate higher frequency harmonics. The filtered baseband signals may then be directed to a synchronization logic block 320e, where the correlation properties of the PN sequence in the transmitted packet are leveraged to obtain coarse time (packet) synchronization. Following the packet synchronization, each ZP-OFDM packet may be portioned into individual OFDM symbols by a block partition logic block 320f.

According to some embodiments, the data is directed to a fast Fourier transform logic block 320g to translate the OFDM symbols into the frequency domain, and then each OFDM symbol is passed through a Doppler scale estimation logic block 320h and a channel estimation and equalization logic block 320i performing compensation based on pilot and null subcarriers, pilot-tone based channel estimation, and zero-forcing (ZF) channel equalization. Next, the data is directed to a symbol detection block 320j. The detected symbols may be translated into bits and decoded by FEC decoder logic block 320l. Finally, the decoded bits may be directed to the FIFO logic block 320m and sent to the general purpose processing unit 112 through an AXI DMA interface 303.

According to some embodiments, the registers 330 of the gate-level digital hardware component 114 may be responsible for storing and reconfiguring the physical layer configuration parameters written by the general purpose processing unit 112 and sent to the registers 330 through the AXI4-Lite interface 302. In some embodiments, the gate-level digital hardware component 114 may control and reconfigure the physical layer configuration parameters in real-time. For example, the physical layer configuration parameters may include modulation, coding rate, guard time, subcarrier mapping, number of ZP-OFDM symbols in a packet.

Some embodiments further include a register controller that delivers updated parameters stored in the registers to the corresponding logic blocks. The parameters may be updated as a result of a reconfiguration (adaptation) decision making that takes place either in the processing system or in the gate-level digital hardware module. In some embodiments, whenever the processing system or the gate-level digital hardware module updates any of the registers, the register controller is triggered to access the register content and deliver it to the corresponding logic block.

Figures 1, 4A:
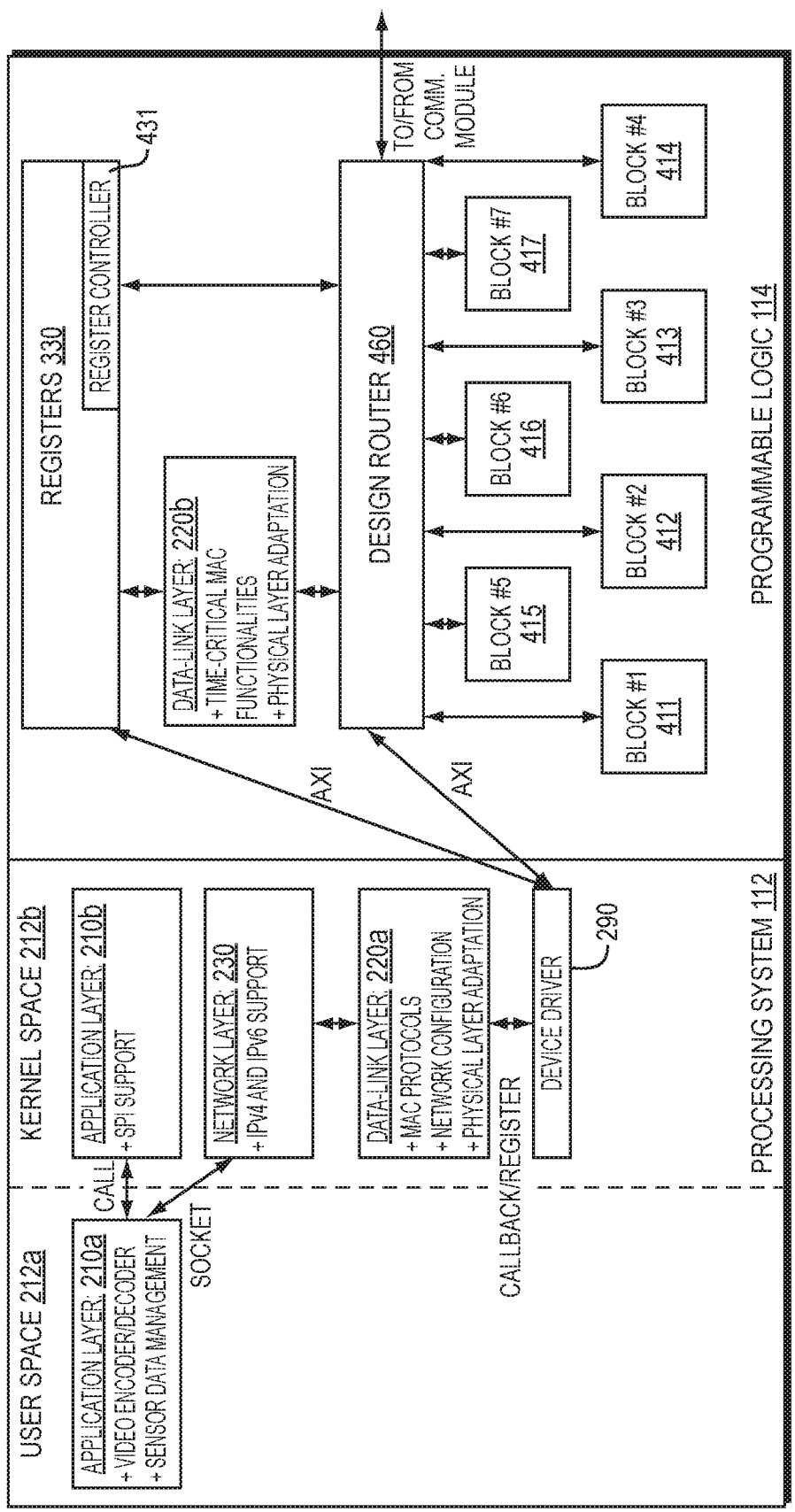
FIG. 4A-1 illustrates a block diagram of a processing and programmable module with a gate-level digital hardware module employing a design router block.
Figures 2, 4A:
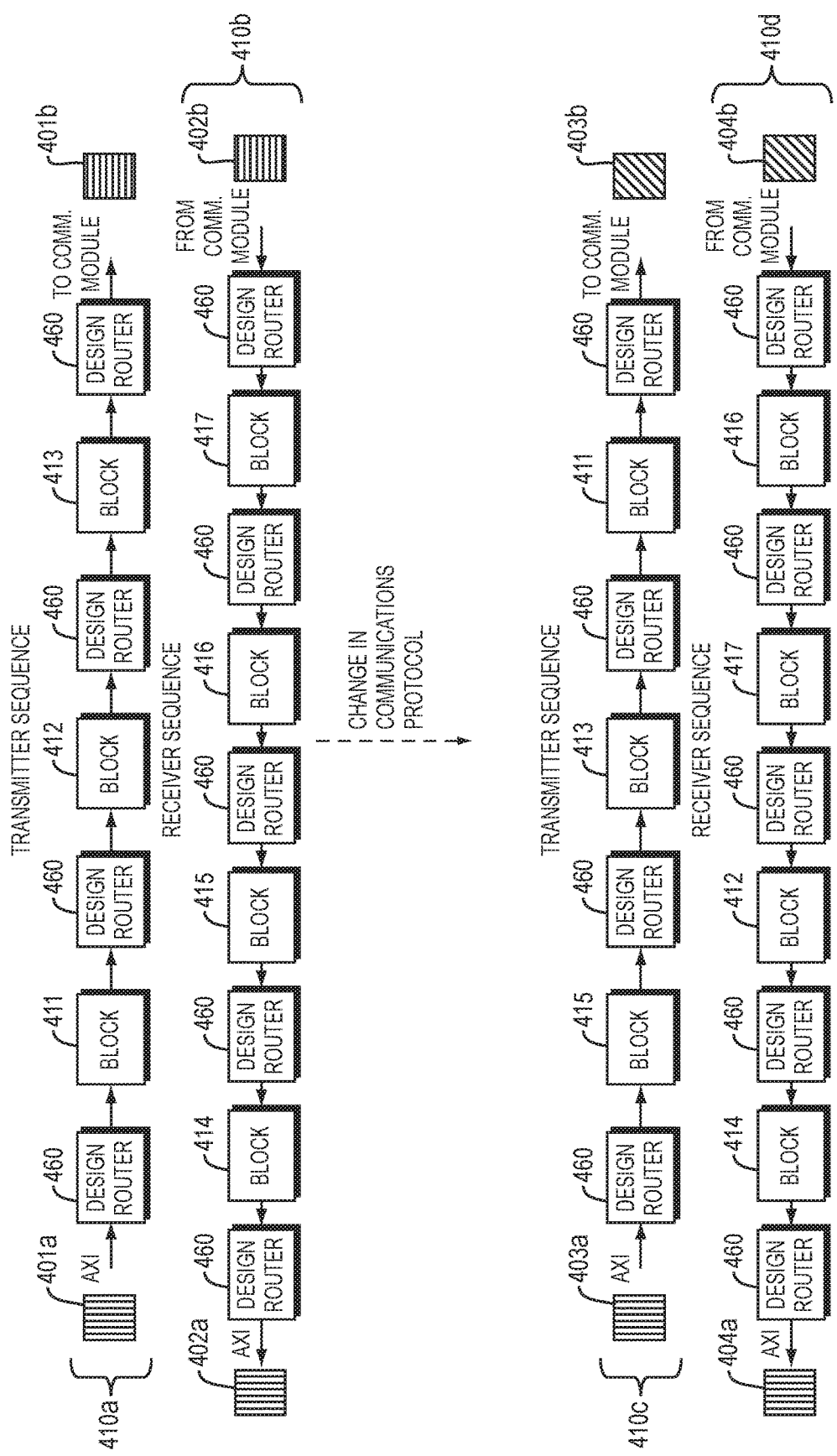

FIG. 4A-1 illustrates a block diagram of an example embodiment of the processing and programmable module 110, with the gate-level digital hardware module 114 employing a design router block 460. In some embodiments, the design router block 460 enables the seamless arrangement of the sequence of physical layer logic (processing) blocks in real-time. According to this embodiment, each logic block is connected to the design router 460 and assigned a unique ID. The design router 460 acts as a FIFO that carries data between logic blocks 411-417 according to processing maps that are used to define different physical layer schemes with different sequences of logic blocks 410a and 410b. The processing maps are dictated to the design router 460 through the register controller 431. Besides the logic blocks 411-417, the design router 460 is connected to link layer (device driver) 290 processing blocks through AXI buses, to send/receive information to/from upper layers, and to the communications module to transmit/receive information to/from the physical world.

For example, FIG. 4A-2 depicts an example transmitter sequence 410a and an example receiver sequence 410b. In some embodiments, the transmitter sequence (Block 411, Block 412, Block 413) 410a may correspond to the processing necessary to transmit a data unit 401a (or information bits) according to a particular communications protocol. According to some embodiments, the data unit 401a having a first format may be sent to the design router 460 to be processed in accordance with a first communications protocol by flowing through transmitter sequence 410a, where the transmitter sequence 410a corresponds to the first communications protocol. The processed data unit 401b that results from the transmitter sequence 410a processing may be sent to a communications module to be transmitted using the first communications protocol.

Further, a data unit 402b may be received from the communications module having been transmitted from another source using the first communications protocol. Similarly, the data unit 402b may be sent to the design router 460 to be processed in accordance with the first communications protocol by flowing through receiver sequence 410b. The processed data unit 402a that results from the receiver sequence 410b may now be in the first format and be sent to a general purpose processing unit (or another destination) for further processing.

In some embodiments, the programming module 110 may implement one or more software modules operated by the processing system 112 or another software environment. The software modules may be configured as at least one software block that is comparable in function to one or more of the blocks 411-417, and the digital hardware module may be configured to access the software block(s) in a sequence of logic blocks such as the sequences 410a-d. The module may be configured to access such a software module to process the data units before, after, or between at least two of the logic blocks 411-417 within the sequence of logic blocks, thereby providing for any processing function not provided by one of the blocks 411-417, or to substitute for a nonfunctional block.

According to some embodiments, the processing and programmable module 110 is able to switch the communications protocol by causing the design router to use a different transmitter sequence corresponding to a different communications protocol (e.g., a second communications protocol). This switch may be performed based on a change in operating conditions, wherein the second communications protocol is a better suited to the current operating conditions. As shown in FIG. 4A-2, the change in communications protocol can be performed on a data unit-by-data unit basis, because the logic blocks 411-417 are pre-existing and the order of the sequence is easily modified by directing the data unit through the logic blocks in a different order using the design router 460 as described above.

According to some embodiments, a subsequent data unit 403a having the first format may be sent to the design router 460 to be processed in accordance with the second communications protocol by flowing through transmitter sequence 410c; transmitter sequence 410c corresponding to the second communications protocol. The processed data unit 403b that results from the transmitter sequence 410c may be sent to the communications module to be transmitted using the second communications protocol.

Further, a data unit 404b may be received from the communications module having been transmitted from another source using the second communications protocol. Similarly, the data unit 404b may be sent to the design router 460 to be processed in accordance with the second communications protocol by flowing through receiver sequence 410d. The processed data unit 404a that results from the receiver sequence 410d may now be in the first format and sent to the general purpose processing unit for further processing.

Figure 4B:
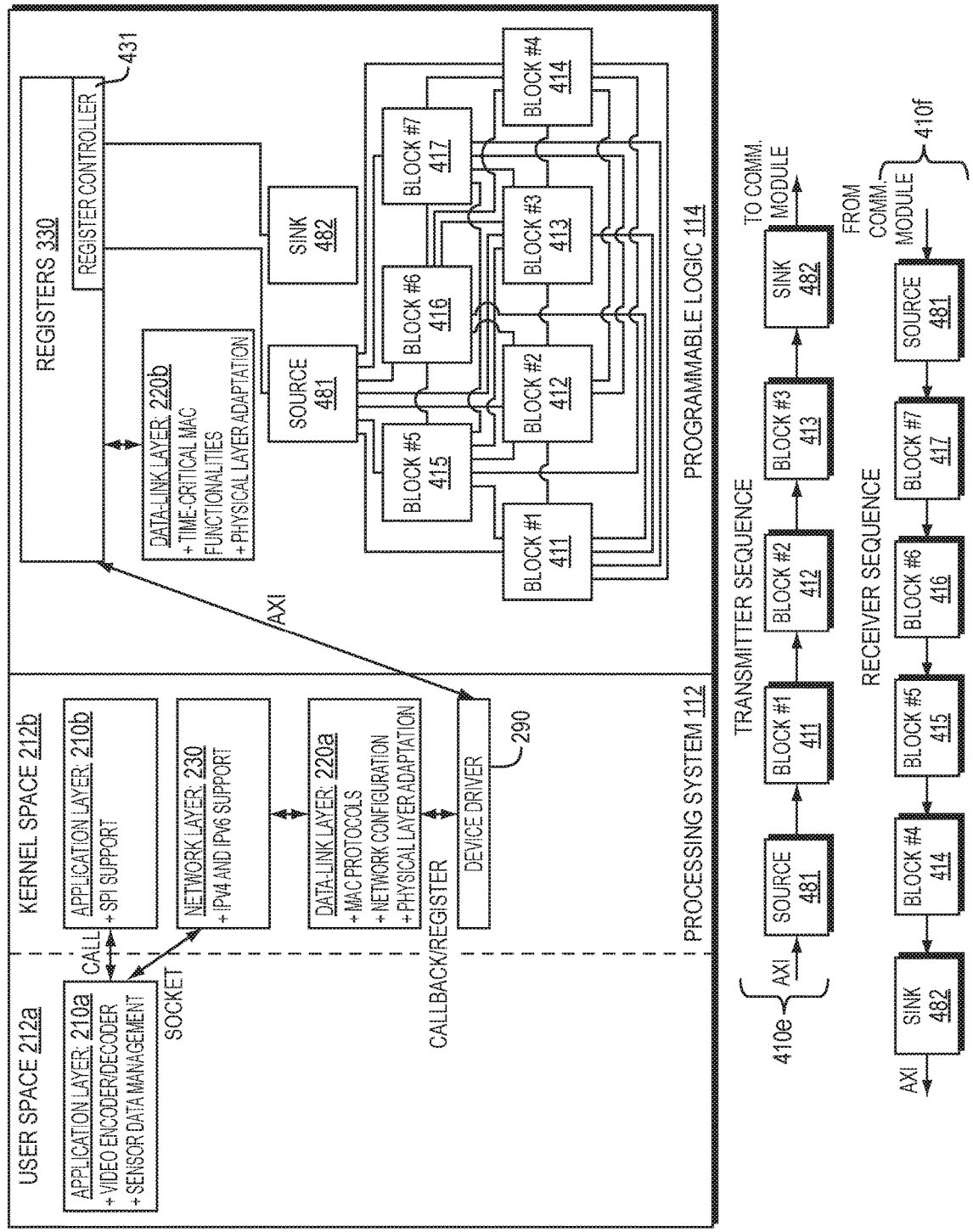
FIG. 4B illustrates a block diagram of a processing and programmable module with a gate-level digital hardware module employing a source, a sink, and interconnected logic blocks.

FIG. 4B illustrates a block diagram of another example embodiment of the processing and programmable module 110 with a gate-level digital hardware module 114 employing a source 481, a sink 482, and interconnected logic blocks 411-417. According to the example embodiment of FIG. 4B, each of the logic blocks 411-417 is interconnected individually to each other logic block, and each logic block is assigned a unique ID. Further, each of the logic blocks is interconnected with the source block 481 and sink block 482. This organization of interconnections enables the seamless arrangement of the sequence of physical layer logic (processing) blocks during runtime.

In some embodiments, each data unit includes a header specifying a sequence of logic blocks (e.g., 410e or 410f) that the respective data unit is to be directed along for processing in accordance with a corresponding communications protocol, and wherein each logic block is configured to direct each data unit to a next logic block or to a sink block according to the respective sequence specified in the header of the data unit. The header in each data unit may be injected by a source block 481 through the register controller 431. Besides injecting the header to each data unit, the source 481 and sink 482 blocks may be connected to the data link layer 220a through AXI buses, to send/receive information to/from upper layers, and to the communications module to transmit/receive information to/from the physical world.

For example, FIG. 4B depicts an example transmitter sequence 410e and an example receiver sequence 410f. In some embodiments, the transmitter sequence 410e (Block 411, Block 412, Block 413) may correspond to the processing necessary to transmit a data unit (or information bits) using a particular communications protocol. The processing and programmable module 110 is able to switch the communications protocol by generating a header specifying a different transmitter sequence corresponding to a different communications scheme. This change in communications protocol can be performed on a data unit-by-data unit basis, because the logic blocks are pre-existing, and an order of the sequence is easily modified by directing the data unit through the logic blocks in a different order using the header as described above. This applies to the receiver sequence as well.

Figure 4C:
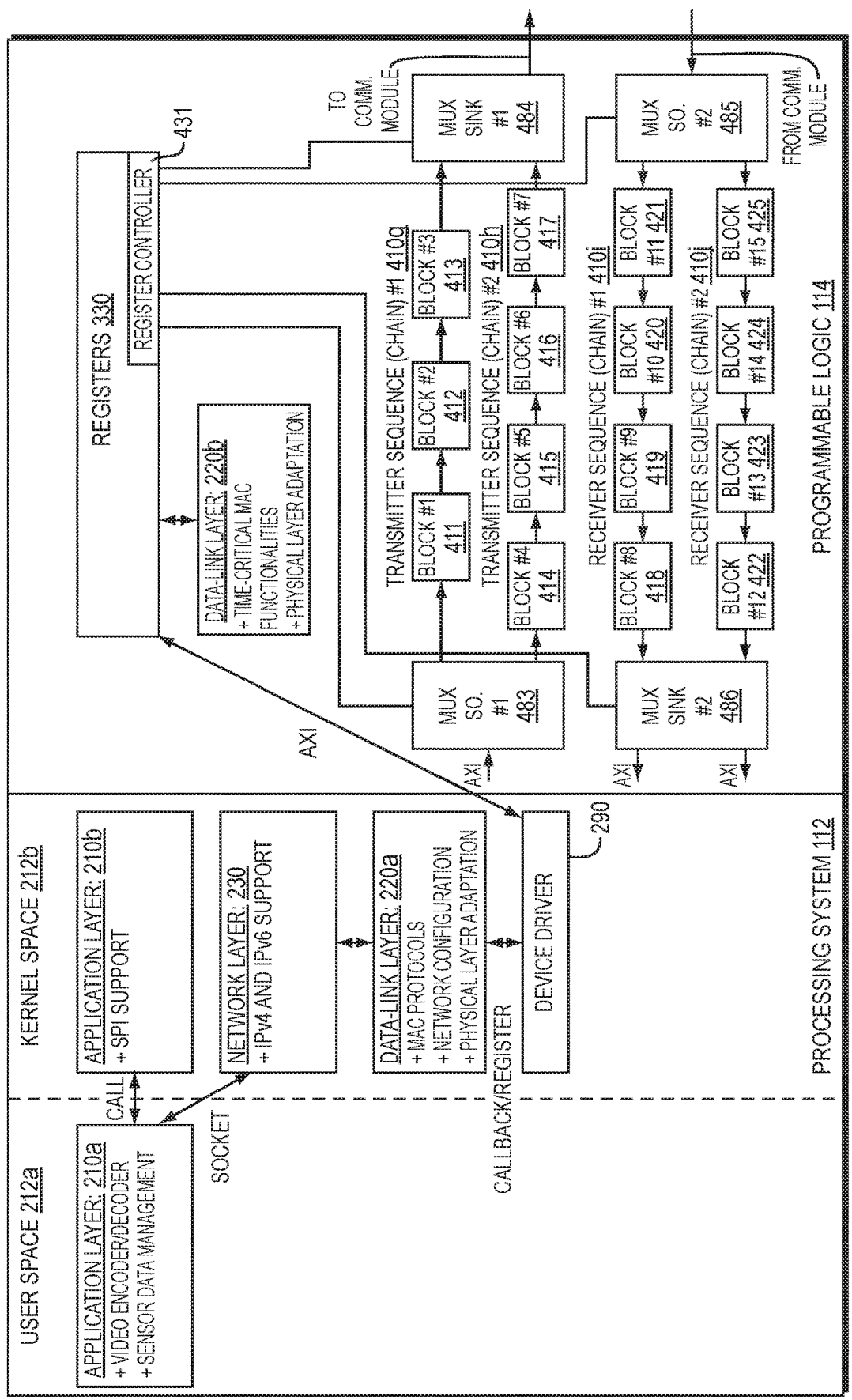
FIG. 4C illustrates a block diagram of a processing and programmable module with a gate-level digital hardware module employing a multiplexing source and a multiplexing sink.

FIG. 4C illustrates a block diagram of another example embodiment of the processing and programmable module 110 with the gate-level digital hardware module 114 employing a multiplexing sources 483, 485 and multiplexing sinks 484, 486. According to this example embodiment, the logic blocks 411-425 may be connected to each other to form transmitter and receiver sequences 410g-j of different communications protocols. Each transmitter sequence 410g, 410h or receiver sequence 410i, 410j is preceded by a multiplexing source block 483, 485 and followed by a multiplexing sink block 484, 486. In some embodiments, the multiplexing source blocks 483, 485 are used to direct each data unit to a transmitter sequence 410g, 410h or a receiver sequence 410i, 410j according to a selected communications protocol. In some embodiments, the selected communications protocols may be dictated to the multiplexing source blocks 483 through the register controller 431. Similarly, the selected communications protocols may be dictated to the multiplexing sink blocks 486 through the register controller 431, which enables each data unit to be carried to the link layer 290 through AXI buses, to send/receive information to/from upper layers, and to the communications module to transmit/receive information to/from the physical world.

For example, FIG. 4C depicts two example transmitter sequences 410g, 410h and two example receiver sequences 410i, 410j. In some embodiments, the first transmitter sequence (Block 411, Block 412, Block 413) 410g may correspond to the processing necessary to transmit a data unit (or information bits) using a first communications protocol, and the second transmitter sequence (Block 414, Block 415, Block 416, Block 417) 410h may correspond to the processing necessary to transmit a data unit (or information bits) using a second communications protocol. The processing and programmable module 110 is able to switch the communications protocol by causing the multiplexer source 483 to switch the transmitter sequence. This change in communications protocols can be performed on a data-unit by data unit basis, because the logic blocks are pre-existing and the order of the sequence is easily modified by directing the data unit through the logic blocks in a different order (sequence) as described above. This applies to the receiver sequences 410i, 410j as well.

The above embodiments have been described as implementing different communications protocols. More specifically, the communication protocols may include a Zero-Padded Orthogonal Frequency-Division-Multiplexing (ZP-OFDM) protocol and a Binary Chirp Spread-Spectrum (B-CSS) protocol, and the error correction techniques may include Reed-Solomon (RS) codes and Convolutional codes.

One of ordinary skill in the art would recognize that embodiments of the present disclosure may be configured to utilize any number of communications protocols. As stated and explained above, some embodiments may utilize a ZP-OFDM protocol. OFDM is a widely used communications protocol for under water acoustic (UW-A) systems, because of OFDM's robustness against frequency-selective channels with long delay spreads. Some embodiments of the underwater acoustic wireless communications platform 100 may adopt an OFDM protocol with zero-padding, where each OFDM symbol is followed by padded zeros. ZP-OFDM is more energy-efficient compared to its counterparts (e.g., cyclic-prefixing (CP)). According to some embodiments, the underwater acoustic wireless communications platform 100 may, in each OFDM symbol, accommodate KP pilot subcarriers to be used in the channel estimation and fine symbol synchronization. Embodiments may also include KN null subcarriers for Doppler estimation and KD data subcarriers, which are conventionally modulated with either M-Phase-Shift-Keying (PSK) or M-Quadrature-Amplitude-Modulation (QAM), for data transmission.

Figure 5:
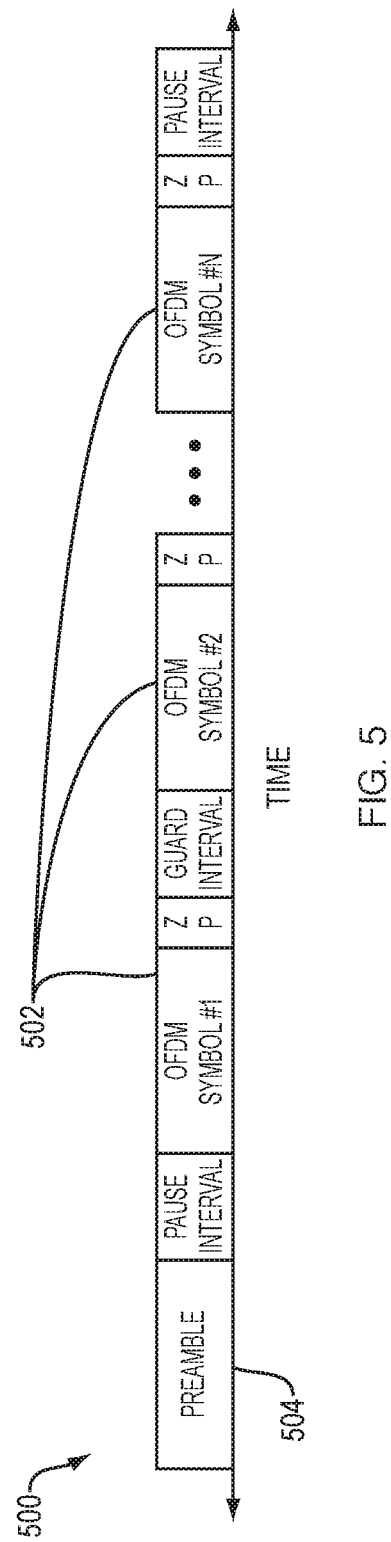
FIG. 5 depicts an example format of a data unit, according to some embodiments.

According to some embodiments, the underwater acoustic wireless communications platform 100 may utilize a data unit (e.g., packet) format 500, as illustrated in FIG. 5. The data unit format depicted in FIG. 5 includes N OFDM symbols 502 preceded with a preamble block 504 that provides packet detection and coarse symbol synchronization. In some embodiments, the underwater acoustic wireless communications platform 100 may provide an option to select the preamble block 504 to be either a pseudo noise (PN)-sequence or a chirp signal based on the network and application requirements.

Binary Chirp Spread-Spectrum (B-CSS) is another communications protocol that embodiments of the present disclosure may utilize. B-CSS is based on chirp signals that are well-known to be resilient against severe multipath and Doppler effects that are the main characteristics of an UW-A channel. B-CSS has been used in UW-A communications, and especially in links that require relatively low data rate but high reliability, such as feedback links. Furthermore, B-CSS is characterized by a very low complexity correlation-based receiver architecture that dramatically decreases the computational complexity.

According to some embodiments, the underwater acoustic wireless communications platform 100 may utilize a novel chirp-based LPD/LPI (Low Probability of Detection/Low Probability of Interception) underwater acoustic communications protocol with code-time-frequency multidimensional spreading. Many of the approaches designed to achieve efficient underwater communications at the physical layer of the communications protocol stack have mostly been focused on designing spectrally efficient yet robust modulation schemes and receivers to operate on the limited bandwidth available in the underwater acoustic channel. Yet, existing technology in this domain is for the most part based on transmitting well-recognized, easily detectable narrow-band signals modulated over low-frequency carriers at high transmission powers, which ultimately limits the stealthiness of the communication scheme and LPD/LPI performance.

Typically, stealthy communications protocols adopt the approach of direct-sequence spread spectrum (DSSS) techniques with either coherent or non-coherent modulations. The main motive behind this approach is to take advantage of the processing gain that comes from spread-spectrum encoding, which enables communications to be carried out at relatively low signal levels and achieve high LPD/LPI performance. An alternative approach is to exploit frequency diversity instead of coding to achieve processing gain. While these protocols and technique may work for some applications, there is clearly significant room to improve the LPD/LPI performance of underwater communications protocols.

A novel communications protocol based on transmitting chirp signals that are further spread over a multidimensional domain spanning code, time, and frequency is described below. The following chirp-based LPD/LPI protocol is a robust LPD/LPI transmission scheme that uses chirp-based acoustic pulses with ultrasonic spectral content following a frequency-hopping pattern and time-hopping pattern together with a superimposed spreading code. The chirp-based LPD/LPI protocol is designed to enable higher LPD/LPI performance compared to state-of-the-art schemes that consider only a single dimension (i.e., code, time, or frequency) and provides a hopping-coding pattern that (i) is not easily recognizable or detectable by an adversary; and (ii) can be robustly detected in adverse channels by a friendly receiver that is aware of the frequency-time hopping pattern, and the spreading code being used.

Some embodiments of the chirp-based LPD/LPI protocol are based on the principle of transmitting a chirp signal with a frequency-hopping pattern and time-hopping pattern following pseudo-random sequences, and with a superimposed spreading code. Chirp-based transmission, frequency-hopping and time-hopping patterns, and spread-spectrum encoding enables a communications protocol with high LPI/LPD performance, receiver performance that is robust and resilient against severe channel effects (i.e., multi-path, scattering, and Doppler), and hardly identifiable characteristics that are not easily associated with the specific system employing them.

In general, chirp modulation or linear frequency modulation (LFM) was first used in in the 1960s. Since then, chirp signals have been used as a communication technology that can enable low data rate, robust, low-power (LPD/LPI) wireless communications on simple-design, low-cost transceivers in different applications including indoor wireless communications, multiuser applications, and WLAN/WPAN applications.

The characteristics of chirp transmissions appear to ideally address the requirements of an LPI/LPD protocol/scheme. First, their high processing gain (time-bandwidth product) and resilience against severe channel effects (e.g., multipath, scattering, Doppler effect, etc.) enables high LPD/LPI performance, because strong reception performance under low signal-to-noise (SNR) conditions reduces the need for high transmission power. Second, the wideband nature of chirp signals results in high LPD/LPI performance, because the low power spectral density reduces the probability of detection and intercepts. Third, chirp signals are ubiquitous in the underwater environment (e.g., dolphin clicks). Therefore, they cannot be easily associated with a specific communication system. Fourth, chirps can be easily generated with mostly digital processing, and the data rate can be flexibly traded for power spectral density and range.

Figure 6A:
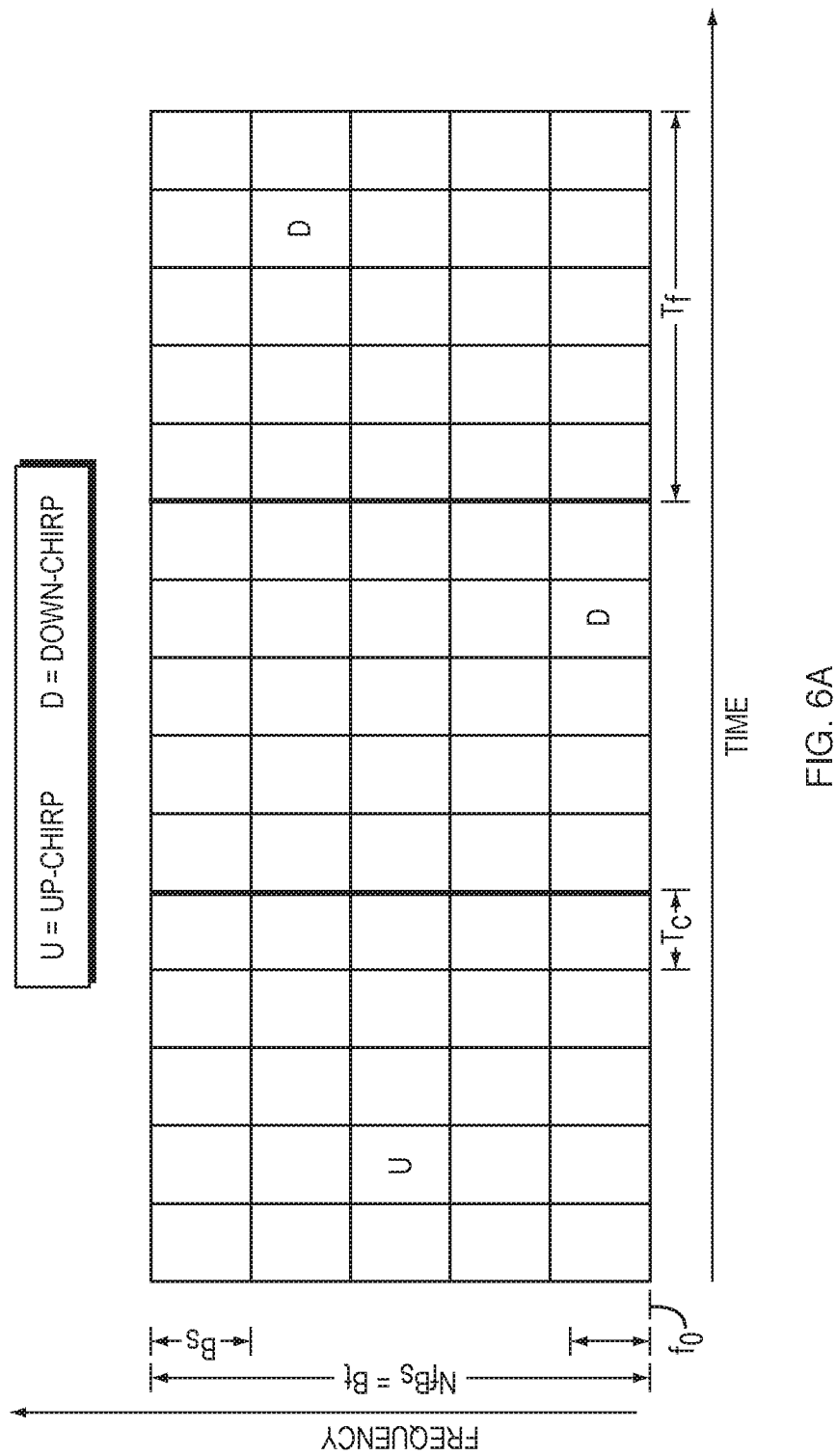
FIG. 6A depicts an example Chirp-Based LPD/LPI communications protocol.

FIG. 6A depicts an example chirp-based LPD/LPI protocol having a combined frequency- and time-hopping strategy that defines a frequency spectrum $B_t$ divided in $N_f$ sub-bands of bandwidth $B_s$ and a slotted time divided in chips of duration $T_c$, with chips organized in frames of duration $T_f = N_h \cdot T_c$ where $N_h$ is the number of chips per frame. Specifically, the example chirp-based LPD/LPI protocol of FIG. 6A is an ongoing transmission using frequency hopping sequence FH={2,0,3}, time hopping sequence TH={2,3,3}, and BOK spreading codes SC={1, -1, -1}.

According to some embodiments, a network node may perform the chirp-based LPD/LPI protocol by transmitting one chirp signal in one chip per frame on one sub-band, and determining in which chip and sub-band to transmit based on a time hopping sequence (THS) and a frequency hopping sequence (FHS), respectively. Both time and frequency hopping sequences are based on pseudo-random sequences generated by seeding random number generators. In some embodiments, a channel coding scheme may be introduced to improve the receiver performance against channel non-idealities. According to some embodiments, each information bit may be represented with psuedo-orthogonal spreading codes because of (i) limited computational complexity, and (ii) inherent resilience to multipath channel effects.

A chirp signal is characterized by a time-varying instantaneous frequency, which changes in time from an initial value $f_0$ to a final value $f_1$. In the time domain, the signal can be expressed as $$c(t) = \begin{cases} A\cos(2\pi f_0 t + \pi\mu t^2) & 0 \le t \le T, \\ 0 & \text{otherwise} \end{cases} \quad (1)$$

where A is the amplitude of the chirp, $f_0$ is the initial chirp frequency, $$\mu = \frac{f_1 - f_0}{T}$$

is the chirp frequency-variation rate, while T represents the chirp period. For the purposes of this disclosure, a chirp with parameter $\mu > 0$ is an up-chirp; otherwise the chirp is a down-chirp. Up and down chirp signals are almost orthogonal to each other. The total bandwidth of the chirp signal can be obtained as $B = f_1 - f_0$.

The train of chirps may be modulated based on binary orthogonal keying (BOK) by leveraging the quasi-orthogonality of up and down-chirps by encoding a '1' information symbol with an up-chirp and a '−1' information symbol with a down-chirp. The signal s(t,i) generated by the system to convey the $i^{th}$ symbol can be expressed based on (1) as $$\hat{t} = (t - c_i T_c - iT_f), \tag{2}$$

$$s(t, i) = \begin{cases} \cos(2\pi f_{ki}\hat{t} + (1-d_i)\pi B_s \hat{t} + d_i \pi \mu \hat{t}^2) & 0 \leq \hat{t} \leq T_c, \\ 0 & \text{otherwise} \end{cases} \tag{3}$$

where $$\mu = \frac{B_s}{T_c},$$

$\{c_i\}$ is the time hopping sequence, with $0 \leq c_i \leq N_h - 1$, $\{k_i\}$ is the frequency hopping sequence, with $0 \leq k_i \leq N_f - 1$, $\{d_i\}$ is the information-bearing sequence, $d_i \in \{-1, 1\}$, and the amplitude of the chirp is assumed to be '1' without loss of generality. The resulting data rate, in chirps per second, is expressed as $$R(N_h) = \frac{1}{T_f} = \frac{1}{N_h T_c}. \tag{4}$$

By regulating the FH frame length $N_f$ and TH frame length $N_h$, (i.e., the average inter-chirp time), a network node can adapt its transmission rate, processing gain, and as a consequence modify the average radiated power, and therefore the communication range of the system.

In some embodiments, at the receiver, frame synchronization and "time hopping" synchronization may be performed to properly decode the received signal. Frame synchronization may consist of finding the correct time alignment between the transmitter frame and the receiver frame. In some embodiments, this is achieved through an energy-collection approach. During the frame synchronization, the transmitter sends a-priori-known sequence, (i.e., a preamble). Specifically, a Doppler-sensitive sequence (i.e., m-sequence) may be used to leverage Doppler scale estimation. In some embodiments, after correlating the received signal and the preambles pre-scaled by different Doppler scaling factors, the receiver may identify both the starting point of the frame as the time instant and the estimated Doppler scale based on the largest correlation peak.

According to some embodiments, the next step may consist of finding the frequency-hopping and time-hopping sequences to hop chip-by-chip and correlate the received chirps. This is achieved by seeding the random generator with the same seed used by the transmitter, and therefore generating the same pseudo-random frequency-hopping and time-hopping sequences. Once both synchronization processes have been accomplished, the receiver decodes the received signal by "listening" in the time chips of interest and correlating the received chirp according to the modulation scheme in use.

A channel code can reduce the effect of channel non-idealities and accordingly increase the receiver performance. Various channel coding solutions have been proposed with different performance levels and computational complexity. Some embodiments of the chirp-based LPD/LPI protocol rely on pseudo-orthogonal spreading codes because of their limited computational complexity and inherent resilience to multipath. Each symbol (i.e., bit) is spread by multiplying it by a binary code before transmission. At the receiver side, with prior knowledge of the code used at the transmitter, the signal can be de-spread, and the original information recovered.

Some embodiments of the chirp-based LPD/LPI protocol utilize BOK-spreading modulation scheme. In BOK-spreading, an information bit is spread using BOK-modulated chips, consequently the pseudo-orthogonal spreading code can be defined as a pseudorandom code of $N_s$ chips with $a_j \in \{-, 1\}$. With frequency- and time-hopping, (2) and (3) can be rewritten as $$\hat{t} = (t - c_j T_c - jT_f), \tag{5}$$

$$s(t,i) = \sum_{j=0}^{n_s - 1} \cos(2\pi f_{kj}\hat{t} + (1-(a_j d_i))\pi B_s \hat{t} + (a_j d_i)\pi \mu \hat{t}^2), \\ 0 \leq \hat{t} \leq T_c, \tag{6}$$

where chip information is carried in the quasi-orthogonality up-chirps and down-chirps. FIG. 6A shows an example of a combined frequency-hopping and time-hopping and BOK-spreading strategy. Since the spreading operation associates $N_s$ chips to one information bit, the information rate will now be $$R(N_h, N_s) = \frac{1}{N_s T_f} = \frac{1}{N_s N_h T_c},$$

while the energy per bit is increased by a factor $N_s$. Note that there is a tradeoff between robustness to noise and multipath (which increases with longer spreading codes), and energy consumption and information rate.

In BOK-spreading, the receiver can use the spreading code employed at the transmitter to obtain the correlator template. As a result, it is important to observe that unlike BPSK-modulated chirp signals that need a coherent receiver with accurate channel knowledge for decoding, a simple non-coherent energy detector receiver is sufficient. The latter requires frame synchronization only, and its implementation complexity is significantly lower.

According to some embodiments, before processing, the signal-to-noise ratio (SNR) at the receiver can be expressed as $$SNR_{int} = \frac{Pg}{\eta}, \tag{7}$$

where P is the average power per chirp signal emitted by the transmitter, g is the path gain between the transmitter and the receiver, and $\eta$ is the noise energy. Chirp signals offer a processing gain proportional to the time-bandwidth product (TB), which enables higher signal-to-noise ratio (SNR) at the receiver after processing. Unlike narrowband pulses, T and B of chirp signals can be increased independently to reach higher processing gain, and accordingly higher receiver SNR. The processing gain can be expressed as $$PG = \frac{TB}{0.886}. \tag{8}$$

In addition to the processing gain, the receiver has SNR gain that is introduced by the spreading code. As a result, the SNR for chirp transmission at the receiver after processing can be expressed as $$SNR_{rec}(N_f, N_h, N_s) = \left(\frac{T_c B_s N_s N_h N_f}{0.886}\right) SNR_{int}. \quad (9)$$

When considering a single user scenario, interference can be neglected. From (9), it can be observed that increasing (or decreasing) the spreading code $N_s$, leads to an increase (decrease) in the receiver SNR.

Figure 6B:
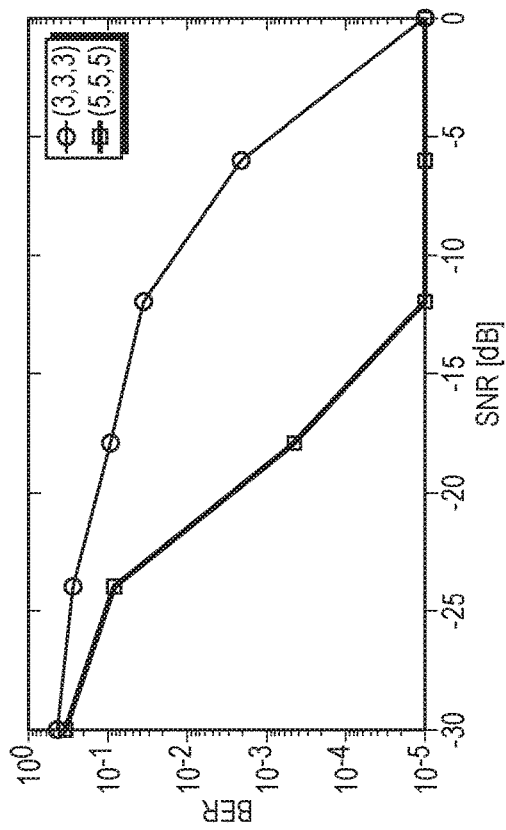
FIG. 6B is a plot of an example channel function with severe multipath.

An example embodiment of the chirp-based LPD/LPI protocol may define chirp signals that with duration of $T_c=1$ ms and bandwidth $B_s=5$ kHz, where the smallest frequency component $f_0$ is selected as 100 kHz. To illustrate this example embodiment, the channel function depicted in FIG. 6B is used. As it can be observed, the channel shows severe multipath, which illustrates the example embodiment under the most challenging conditions.

Figure 6C:
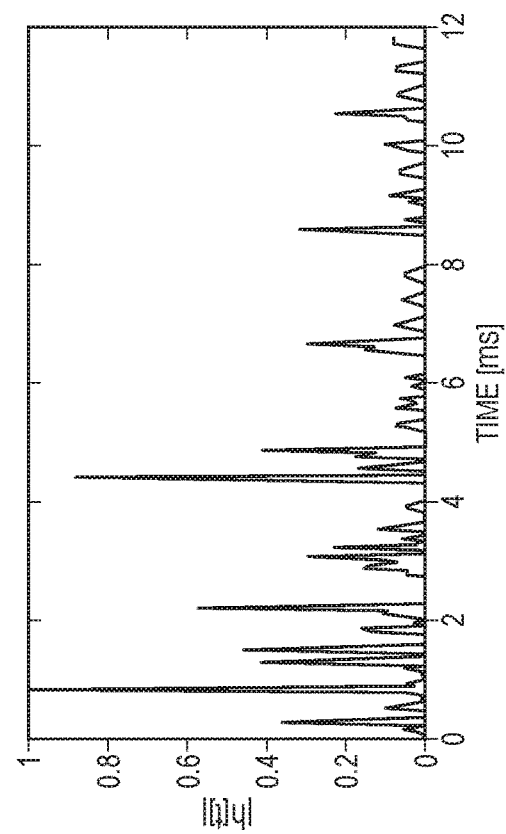
FIG. 6C is a plot of bit rate error (BER) versus signal to noise ratio (SNR) values for different sets of frequency-hopping frame length, time-hopping frame length, and spreading code length ($N_f$, $N_h$, $N_s$).

FIG. 6C presents BER versus SNR values for different sets of frequency-hopping frame length, time-hopping frame length, and spreading code length ($N_f$, $N_h$, $N_s$), specifically (3, 3, 3) and (5, 5, 5). The bit-error-rate (BER) performance of the example embodiment for varying SNR values can be determined. The BER decreases as a function of the SNR and that by using larger frequency-hopping and time-hopping frame and spreading code lengths, the BER is further reduced. Further, it can be seen that even at very small SNR values, the example embodiment can still offer robust BER performance. As such, even if very small transmission power is used to significantly improve the LPD/LPI performance, network nodes utilizing the chirp-based LPD/LPI protocol can still obtain a robust communication link.

Figure 6D:
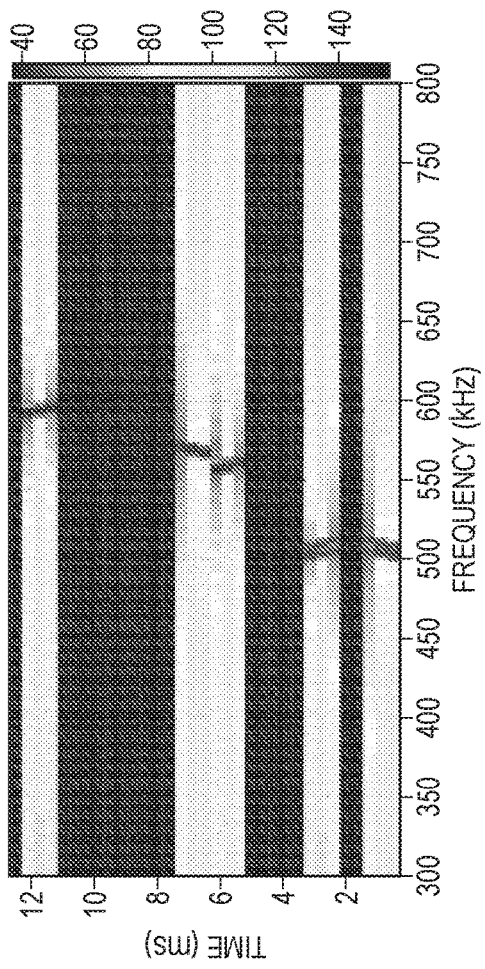
FIG. 6D is a spectrogram of an actual LPI/LPD waveform output.

FIG. 6D is an example spectrogram of an actual LPI/LPD waveform output of $d_i=1$ using frequency-hopping sequence FH={11, 13, 18} with $N_f=30$, time hopping sequence TH={2, 0, 2} with $N_h=3$, and BOK spreading codes SC={-1, 1, -1} with $N_s=3$. The waveform is preceded by a preamble structured as two simultaneous up-chirps in the first two lowest frequency bins at the first time-hopping slot and two simultaneous down-chirps in the first two lowest frequency bins at the last time-hopping slot. The first part of the preamble is used specifically for packet detection, while the second part is used solely for frame synchronization. Moreover, the combination of these two parts is exploited for Doppler scale estimation. This enables the successful transmission of over 100000 bits without having any errors with an average SNR of 19 dB.

One of ordinary skill in the art would recognize that embodiments of the present disclosure may be configured to utilize different types of forward error correction (FEC) codes. For example, the underwater acoustic wireless communications platform 100 may utilize Reed-Solomon (RS) codes or convolutional codes.

RS codes are linear block-type error-correction codes designed to correct potential errors caused by channel fluctuations and inter-symbol-interference. An RS encoder converts k information symbols into an n sized symbol block by adding t redundancy symbols. Correspondingly, an RS decoder obtains k information symbols from an n sized symbol block, while being able to correct up to t/2 of them.

Convolutional codes are error-correction codes that work with arbitrary sized symbol streams. They generate parity symbols by applying a sliding boolean polynomial function to data streams. Convolutional codes can be punctured with different puncturing schemes to decrease the coding overhead and correspondingly reach higher data rates.

Figure 7:
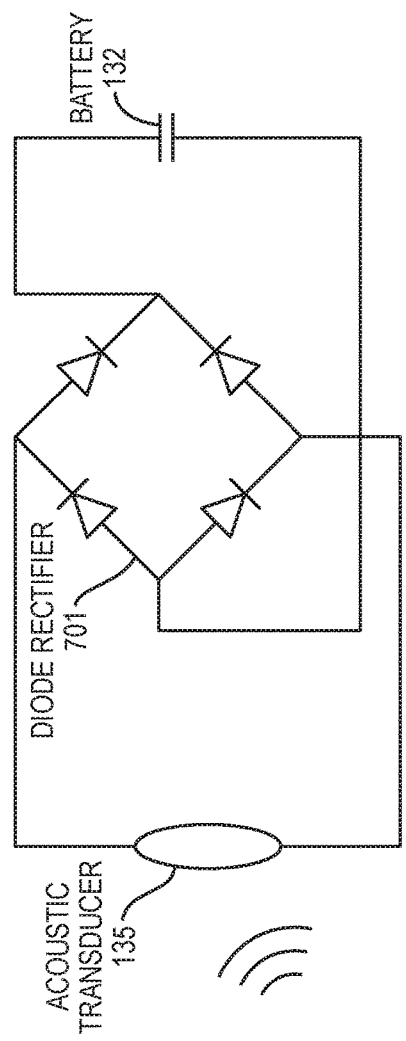
FIG. 7 is a schematic of an example wireless energy transfer unit.

FIG. 7 is a schematic of an example wireless energy transfer unit 137, according to some embodiments. The wireless transfer unit 137 enables the use of acoustic waves to harvest energy and recharge battery units (e.g., central battery unit 132). The wireless energy transfer unit 137 may utilize contactless energy transfer (CET) or wireless power transmission (WPT) for transmitting energy or power wirelessly and accordingly avoiding direct wired connections. Example approaches include inductive and capacitive WPT, which are based on electromagnetic fields (EMFs), and optical coupling.

Acoustic energy transfer (AET) is an innovative methodology to transmit power remotely using acoustic waves. In contrast to electromagnetic waves, acoustic waves need a medium to propagate and consequently transfer energy. The physical characteristics of the propagation medium primarily impact the speed of the traveling wave and result in three loss effects: diffraction, attenuation and reflection. Nevertheless, the idea of exploiting ultrasounds as carriers of energy can be extended to underwater scenarios aiming to design a CET system immersed in water. A system for underwater WPT through acoustic waves consists of three key macro components, the transmitter, the propagation medium and the receiver. Different choices in the implementation of these components (including piezoelectric elements, circuitry details, choice of the operational frequency, among others) should be directed at maximizing the amount of energy transferred through water by minimizing these three types of losses.

According to the example wireless energy transfer unit 137, as illustrated in FIG. 7, an energy harvesting transducer 135 is interfaced with a diode rectifier circuit 701 that converts the AC electrical voltage from the energy harvesting transducer 135 into a DC signal used to recharge a battery 132 or a super capacitor.

FIG. 8A illustrates an example hybrid network 800 topology where both centralized and decentralized control are considered. According to this example network, the hybrid network 800 includes a centralized node 801 that coordinates with the network nodes 802a-802d. In some embodiments, the centralized node 801 may support RF communications 805a and acoustic communications 805b and act as a gateway between an underwater acoustic network 810 and a terrestrial network 820. Additionally, some embodiments of underwater acoustic networks 810 may include one or more network nodes 803a that act as a peer to another network node 802d to communicate data between the two nodes.

Figure 8B:
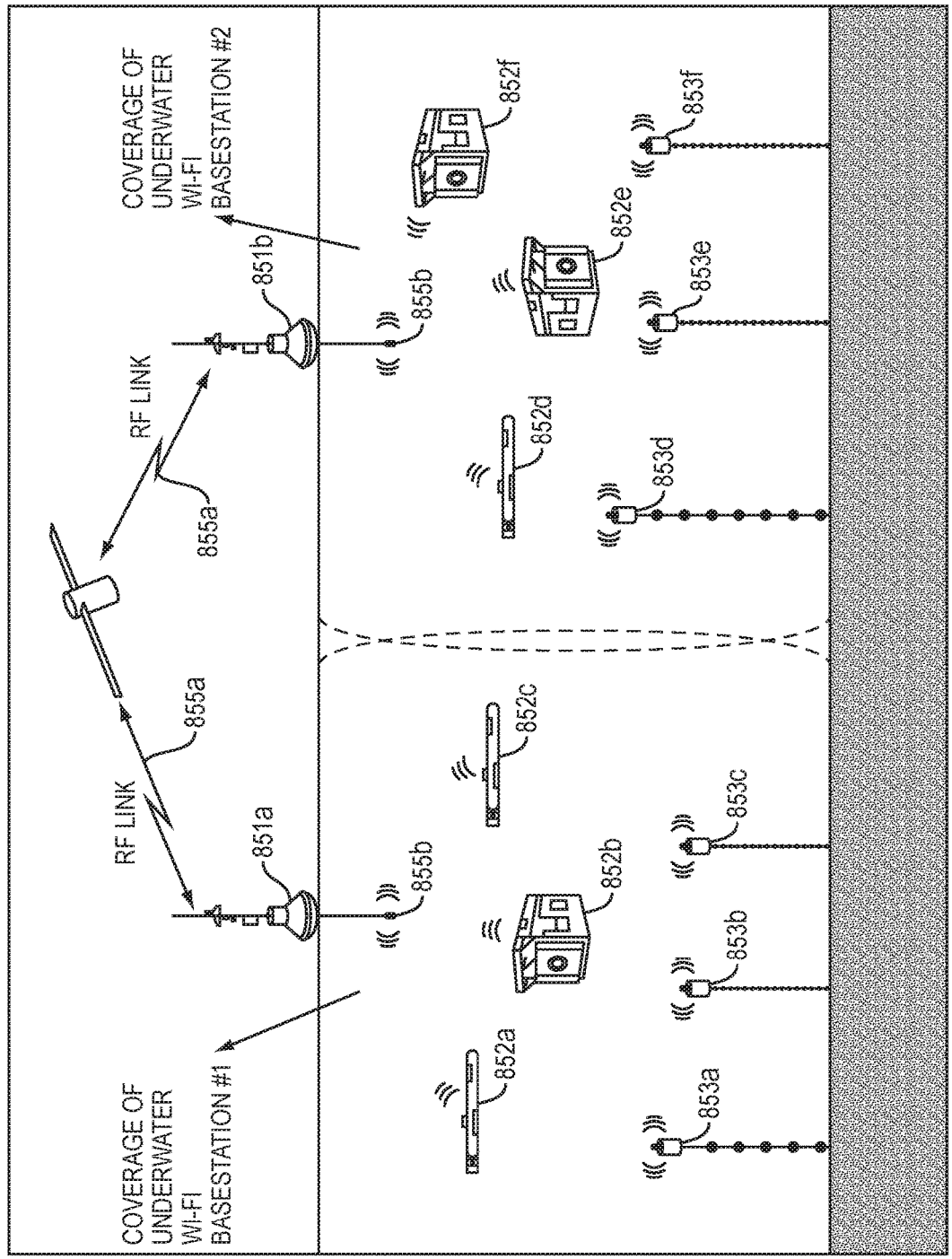
FIG. 8B illustrates an example application of a hybrid network enabling an underwater Wi-Fi network.

FIG. 8B illustrates an example application of a hybrid network enabling an underwater Wi-Fi network 850. The underwater Wi-Fi network 850 can provide short-range (e.g., up to 500 meters) high-rate wireless connectivity for unmanned vehicles 852a-f, scuba divers, and other equipment in areas with underwater infrastructure (e.g., oil rigs) and/or base stations 851a-b that act as gateway between RF domain 855a and acoustic domain 855b. The underwater Wi-Fi network 850 is designed to be a self-configuring technology that provides multiple users/devices support. Utilizing embodiments of the underwater acoustic wireless communications platform described above, the underwater Wi-Fi network 850 can support the high data rates that are required for streaming data from/to RF domain 855a. The underwater Wi-Fi network 850 enables seamless mobility for underwater users/devices 852a-f with handoff support while switching base stations (cells) 855b and/or other network nodes.

The underwater Wi-Fi network may be implemented utilizing the embodiments of the underwater acoustic wireless communications platforms/network nodes. Such underwater acoustic wireless communications network nodes would operate with an OFDM scheme, and implement an optimized resource allocation scheme algorithm at the data link layer to assign dynamically time-frequency blocks to users/devices based on distance, channel, and traffic data.

Figure 9:
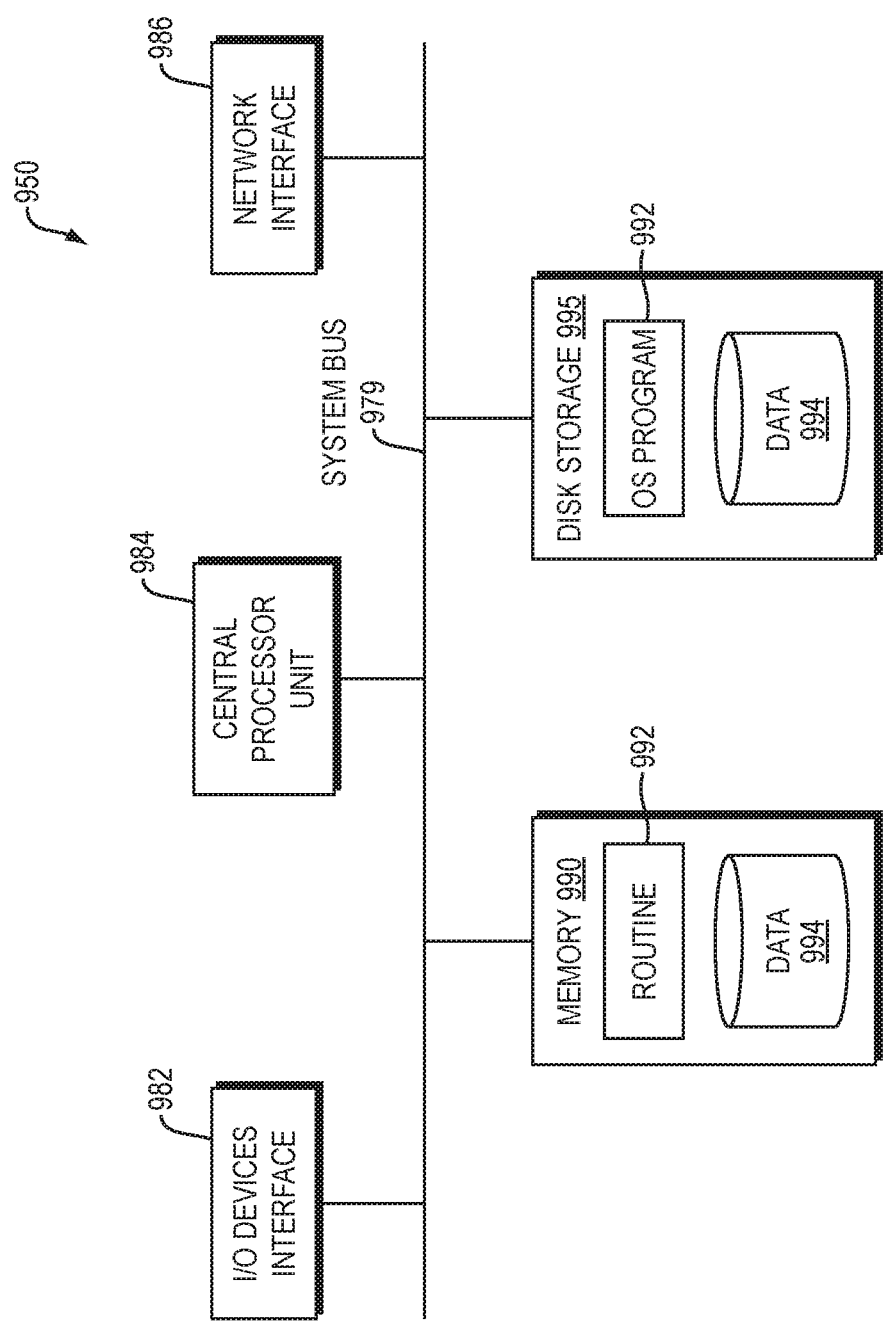
FIG. 9 is a block diagram of an example internal structure of a computer in which various embodiments of the present disclosure may be implemented.

FIG. 9 is a block diagram of the internal structure of a computer 950 in which various embodiments of the present disclosure may be implemented. For example, the general processing unit 112 may have an architecture similar to the structure of the computer 950. The computer 950 contains a system bus 979, where a bus is a set of hardware lines used for data transfer among the components of a computer or processing system. Bus 979 is essentially a shared conduit that connects different elements of a computer system (e.g., processor, disk storage, memory, input/output ports, network ports, etc.) that enables the transfer of information between the elements. Attached to system bus 979 is I/O device interface 982 for connecting various input and output devices (e.g., keyboard, mouse, displays, printers, speakers, etc.) to the computer 950. Network interface 986 allows the computer 950 to connect to various other devices attached to a network. Memory 990 provides volatile storage for computer software instructions 992 and data 994 used to implement an embodiment of the present disclosure. Disk storage 995 provides non-volatile storage for computer software instructions 992 and data 994 used to implement an embodiment of the present disclosure. Central processor unit 984 is also attached to system bus 979 and provides for the execution of computer instructions.

In one embodiment, the processor routines 992 and data 994 are a computer program product (generally referenced 992), including a computer readable medium (e.g., a removable storage medium such as one or more DVD-ROM's, CD-ROM's, diskettes, tapes, etc.) that provides at least a portion of the software instructions for the invention system. Computer program product 992 can be installed by any suitable software installation procedure, as is well known in the art.

In another embodiment, at least a portion of the software instructions may also be downloaded over a cable, communication and/or wireless connection.

Further, embodiments of the present invention may be implemented in a variety of computer architectures. The computer of FIG. 9 is for purposes of illustration and not limitation of embodiments of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments or aspects thereof may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A node in an acoustic network, the node comprising:
a communications module configured to receive or transmit network communications carried at acoustic wavelengths via an acoustic medium, each of the network communications being defined by a communications protocol among multiple communications protocols; and a digital hardware module communicatively coupled to the communications module and defining therein logic blocks having hardware circuitry configured to perform primitive processing functions, sequences of the logic blocks being capable of processing data units in accordance with any of the multiple communications protocols without reconfiguring the logic blocks themselves, the digital hardware module configured to:
process a data unit in accordance with a first communications protocol of the multiple communications protocols by directing the data unit through a first sequence of logic blocks; and
process a subsequent data unit in accordance with a second communications protocol of the multiple communications protocols by directing the subsequent data unit through a second sequence of logic blocks.

2. The node of claim 1, wherein the communications module is a first communications module, and further comprising a second communications module, the digital hardware module being configured to be communicatively coupled to the second communications module in place of the first communications module.

3. The node of claim 2, wherein the first communications module is configured to receive or transmit network communications in accordance with the first communications protocol, and wherein the second communications module is configured to receive or transmit network communications in accordance with the second communications protocol.

4. The node of claim 3, wherein the first and second communications protocols correspond to distinct frequency bands.

5. The node of claim 1, wherein the digital hardware module further includes a software module configured as at least one software block, the digital hardware module configured to access the at least one software block in the first sequence of logic blocks.

6. The node of claim 1 wherein the digital hardware module is configured to access a software module to process the data units before, after, or between at least two of the logic blocks within the first sequence of logic blocks or the second sequence of logic blocks.

7. The node of claim 1, wherein the digital hardware module utilizes a router defined therein to direct each data unit through respective sequences of logic blocks.

8. The node of claim 1, wherein each data unit includes a header specifying a sequence of logic blocks the respective data unit is to be directed along for processing in accordance with a corresponding communications protocol, and wherein each logic block is configured to direct each data unit to a next logic block or to an output port according to the respective sequence specified in the header of the data unit.

9. The node of claim 8, further comprising a processor communicatively coupled to the digital hardware module and configured to:
select a communications protocol from among the multiple communications protocols, and
communicate application data and the selected communications protocol to the digital hardware module.

10. The node of claim 9, wherein the digital hardware module is further configured to convert the application data into a data unit including a header specifying a sequence of logic blocks the data unit is to be directed along for processing according to the selected communications protocol.

11. A method of acoustic communication comprising:
receiving or transmitting network communications carried at acoustic wavelengths via an acoustic medium, each of the network communications being defined by a communications protocol among multiple communications protocols;
defining in a digital hardware module, logic blocks configured to perform primitive processing functions, sequences of the logic blocks being capable of processing data units in accordance with any of the multiple communications protocols without reconfiguring the logic blocks themselves;
processing a data unit in accordance with a first communications protocol of the multiple communications protocols by directing the data unit through a first sequence of logic blocks; and
processing a subsequent data unit in accordance with a second communications protocol of the multiple communications protocols by directing the subsequent data unit through a second of sequence logic blocks.

12. The method of claim 11, wherein receiving or transmitting the network occurs at a first communications module, and further comprising communicatively coupling a second communications module to the digital hardware module in place of the first communications module.

13. The method of claim 12, wherein the first communications module is configured to receive or transmit network communications in accordance with the first communications protocol, and wherein the second communications module is configured to receive or transmit network communications in accordance with the second communications protocol.

14. The method of claim 13, wherein the first and second communications protocols correspond to distinct frequency bands.

15. The method of claim 11, wherein the digital hardware module further includes a software module configured as at least one software block, and further comprising accessing the at least one software block in the first sequence of logic blocks.

16. The method of claim 11, further comprising, at the digital hardware module, accessing a software module to process the data units before, after, or between at least two of the logic blocks within the first sequence of logic blocks or the second sequence of logic blocks.

17. The method of claim 11, wherein directing each data unit through the first and second sequences of logic blocks is performed by a router defined in the digital hardware module.

18. The method of claim 11, wherein each data unit includes a header specifying a sequence of logic blocks the respective data unit is to be directed along for processing in accordance with a corresponding communications protocol, and, by each logic block in the sequence, directing each data unit to a next logic block or to an output port according to the respective sequence specified in the header of the data unit.

19. The method of claim 18, further comprising communicating application data to the digital hardware module by selecting a communications protocol from among the multiple communications protocols, and converting the application data into a data unit including a header specifying a sequence of logic blocks the data unit is to be directed along for processing according to the selected communications protocol.

20. The method of claim 18, further comprising receiving a data unit from a transmitter device, and assigning a header to the received data unit specifying a sequence of logic blocks the received data unit is to be directed along for processing according to a communications protocol.

21. The method of claim 11, wherein directing each data unit through the first and second sequences of logic blocks is performed by a multiplexing source and a multiplexing sink defined in the digital hardware module to direct each data unit through respective sequences of logic blocks.

* * * * *